(12) United States Patent
Hirohashi et al.

(10) Patent No.: US 11,325,546 B2
(45) Date of Patent: May 10, 2022

(54) ROTARY CONNECTOR

(71) Applicant: ALPS ALPINE CO., LTD., Tokyo (JP)

(72) Inventors: Makoto Hirohashi, Miyagi (JP); Toshiaki Asakura, Miyagi (JP); Hiroyuki Sato, Tokyo (JP); Toshiyuki Hoshi, Miyagi (JP); Hiroshi Hanzawa, Miyagi (JP); Satoshi Terashita, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 0 days.

(21) Appl. No.: 17/025,144

(22) Filed: Sep. 18, 2020

(65) Prior Publication Data
US 2021/0070238 A1 Mar. 11, 2021

Related U.S. Application Data

(63) Continuation of application No. PCT/JP2018/039911, filed on Oct. 26, 2018.

(30) Foreign Application Priority Data

Mar. 22, 2018 (JP) .............................. JP2018-055223
Jul. 25, 2018 (JP) .............................. JP2018-139548

(51) Int. Cl.
*H01R 39/00* (2006.01)
*B60R 16/027* (2006.01)
(Continued)

(52) U.S. Cl.
CPC ......... *B60R 16/027* (2013.01); *H01R 35/025* (2013.01); *B62D 1/046* (2013.01); *H01R 2201/26* (2013.01)

(58) Field of Classification Search
CPC .......................... H01R 35/025; H01R 2201/26; B60R 16/027; B62D 1/046
(Continued)

(56) References Cited

U.S. PATENT DOCUMENTS 4,868,355 A * 9/1989 Inui ....................... B60R 16/027
200/61.54
4,927,364 A * 5/1990 Inui ....................... B60R 16/027
439/15
(Continued)

FOREIGN PATENT DOCUMENTS

JP H07-132783 5/1995
JP H11-016653 1/1999
(Continued)

OTHER PUBLICATIONS

International Search Report for PCT/JP2018/039911 dated Jan. 15, 2019.

*Primary Examiner* — Abdullah A Riyami
*Assistant Examiner* — Vladimir Imas
(74) *Attorney, Agent, or Firm* — IPUSA, PLLC

(57) ABSTRACT

A rotary connector includes a case including a housing space and fixed to a vehicle body that includes a steering wheel including a steering-side electric component, a rotor that is rotatable around a rotational axis relative to the case, a first connector provided on the rotor and electrically connected to the steering-side electric component, a second connector provided on the case and electrically connected to a vehicle-side electric component in the vehicle body, a flexible cable that is provided in a wound state in the housing space of the case and electrically connects the first connector to the second connector, and a controller that is disposed between the first connector and the flexible cable and performs a predetermined process on an electric signal transmitted between the first connector and the flexible cable. The controller is configured to rotate together with the rotor.

19 Claims, 27 Drawing Sheets

(51) Int. Cl.
  *H01R 35/02* (2006.01)
  *B62D 1/04* (2006.01)
(58) Field of Classification Search
  USPC ............................................................ 439/15
  See application file for complete search history.

(56) References Cited

U.S. PATENT DOCUMENTS

| | | | | |
|---|---|---|---|---|
| 5,246,377 A * | 9/1993 | Kawahara | ............ | H01R 35/025 439/15 |
| 5,286,219 A * | 2/1994 | Ueno | .................... | H02G 11/00 439/15 |
| 5,593,310 A * | 1/1997 | Kawamoto | ............ | B60R 16/027 439/15 |
| 5,674,082 A * | 10/1997 | Okuhara | .............. | H01R 35/025 439/15 |
| 5,752,843 A * | 5/1998 | Kawamoto | ........... | H01R 35/025 439/15 |
| 5,980,285 A * | 11/1999 | Matsumoto | ........... | B60R 16/027 439/736 |
| 6,155,106 A * | 12/2000 | Sano | .................... | G01D 5/2451 73/117.02 |
| 6,299,454 B1 * | 10/2001 | Henderson | ............. | H01R 39/64 439/19 |
| 6,736,657 B2 | 5/2004 | Bonn | | |
| 7,029,284 B2 * | 4/2006 | Khoury | ................. | B60R 16/027 439/15 |
| 7,758,363 B2 | 7/2010 | Tanaka et al. | | |
| 9,300,100 B2 * | 3/2016 | Abe | ....................... | H01R 35/04 |
| 9,371,046 B2 * | 6/2016 | Utsunomiya | ........... | G01B 7/30 |
| 10,259,499 B2 * | 4/2019 | Adachi | ................. | B60R 16/027 |

FOREIGN PATENT DOCUMENTS

| | | |
|---|---|---|
| JP | 2003-524363 | 8/2003 |
| JP | 2008-007075 | 1/2008 |
| JP | 2016-107808 | 6/2016 |

* cited by examiner

ROTARY CONNECTOR

CROSS-REFERENCE TO RELATED APPLICATIONS

The present application is a continuation application filed under 35 U.S.C. 111(a) claiming benefit under 35 U.S.C. 120 and 365(c) of PCT International Application No. PCT/JP2018/039911 filed on Oct. 26, 2018, which is based on and claims priority to Japanese Patent Application No. 2018-055223 filed on Mar. 22, 2018 and Japanese Patent Application No. 2018-139548 filed on Jul. 25, 2018, the entire contents of which are incorporated herein by reference.

BACKGROUND OF THE INVENTION

1. Field of the Invention

An aspect of this disclosure relates to a rotary connector.

2. Description of the Related Art

There are known technologies used in vehicles such as automobiles for electrically connecting various electric components (such as switches and sensors, which are hereafter referred to as "steering-side electric components") provided in a steering wheel to various electric components (such as an electronic control unit (ECU), which are hereafter referred to as "vehicle-side electric components") provided in a vehicle body by using a rotary connector provided between the steering wheel and the vehicle body.

For example, a rotary connector includes a case that is statically attached to a vehicle body, a rotor that is rotatable relative to the case and to which a steering wheel is attached, and a flexible cable (for example, a flexible printed circuit (FPC) or a flat cable) that is provided in a housing space of the case in a wound state and electrically connects steering-side electric components and vehicle-side electric components to each other. With this configuration of the rotary connector, when a rotating operation of the steering wheel is performed and the rotor rotates together with the steering wheel, the flexible cable is wound and unwound, and the electric connection via the flexible cable between the steering-side electric components and the vehicle-side electric components is maintained.

In such a rotary connector, to give flexibility to the flexible cable, no shield is provided for the flexible cable. Therefore, when an electric signal (analog signal) output from a steering-side electric component passes through the flexible cable, external noise is likely to be superimposed on the electric signal. For this reason, in a steering device using such a rotary connector, a control device for performing analog-digital conversion on an electric signal output from a steering-side electric component is provided in an empty space inside of the steering wheel. This configuration makes it possible to increase the noise resistance of the electric signal output from the steering-side electric component by digitizing the electric signal before the electric signal passes through the flexible cable and thereby prevent noise from being superimposed on the electric signal.

By the way, in recent years, the number and types of steering-side electric components have increased and along with this increase, the number of wires connected to the steering-side electric components and the number of control devices for performing various controls (for example, analog-digital conversion described above) on electric signals input/output to/from the steering-side electric components have also increased. Accordingly, it is difficult to place these components in an empty space in the steering wheel.

For the above reason, Japanese Unexamined Patent Application Publication No. 2016-107808 discloses a technology that aims to suppress an increase in the size of a steering wheel resulting from an increase in functions provided in the steering wheel. In Japanese Unexamined Patent Application Publication No. 2016-107808, in a steering device where switches and heaters are provided in a steering wheel and a combination module is provided between the steering wheel and an in-vehicle controller, an integrated controller for centrally controlling the switches and the heaters is provided on a spiral cable in the combination module.

However, in the technology disclosed in Japanese Unexamined Patent Application Publication No. 2016-107808, there is no description about how the integrated controller is provided on the spiral cable; and therefore, even if an increase in the size of the steering wheel can be suppressed, the size of the combination module may increase.

Accordingly, there is a demand for a small rotary connector that can suppress the influence of noise on an electric signal input and output to and from a steering wheel.

SUMMARY OF THE INVENTION

According to an aspect of this disclosure, a rotary connector includes a case including a housing space and fixed to a vehicle body that includes a steering wheel including a steering-side electric component, a rotor that is rotatable around a rotational axis relative to the case, a first connector provided on the rotor and electrically connected to the steering-side electric component, a second connector provided on the case and electrically connected to a vehicle-side electric component in the vehicle body, a flexible cable that is provided in a wound state in the housing space of the case and electrically connects the first connector to the second connector, and a controller that is disposed between the first connector and the flexible cable and performs a predetermined process on an electric signal transmitted between the first connector and the flexible cable. The controller is configured to rotate together with the rotor.

DESCRIPTION OF THE PREFERRED EMBODIMENTS

First Embodiment

Below, a first embodiment is described with reference to the drawings.

(Outline of Rotary Connector 10)

Figure 1:
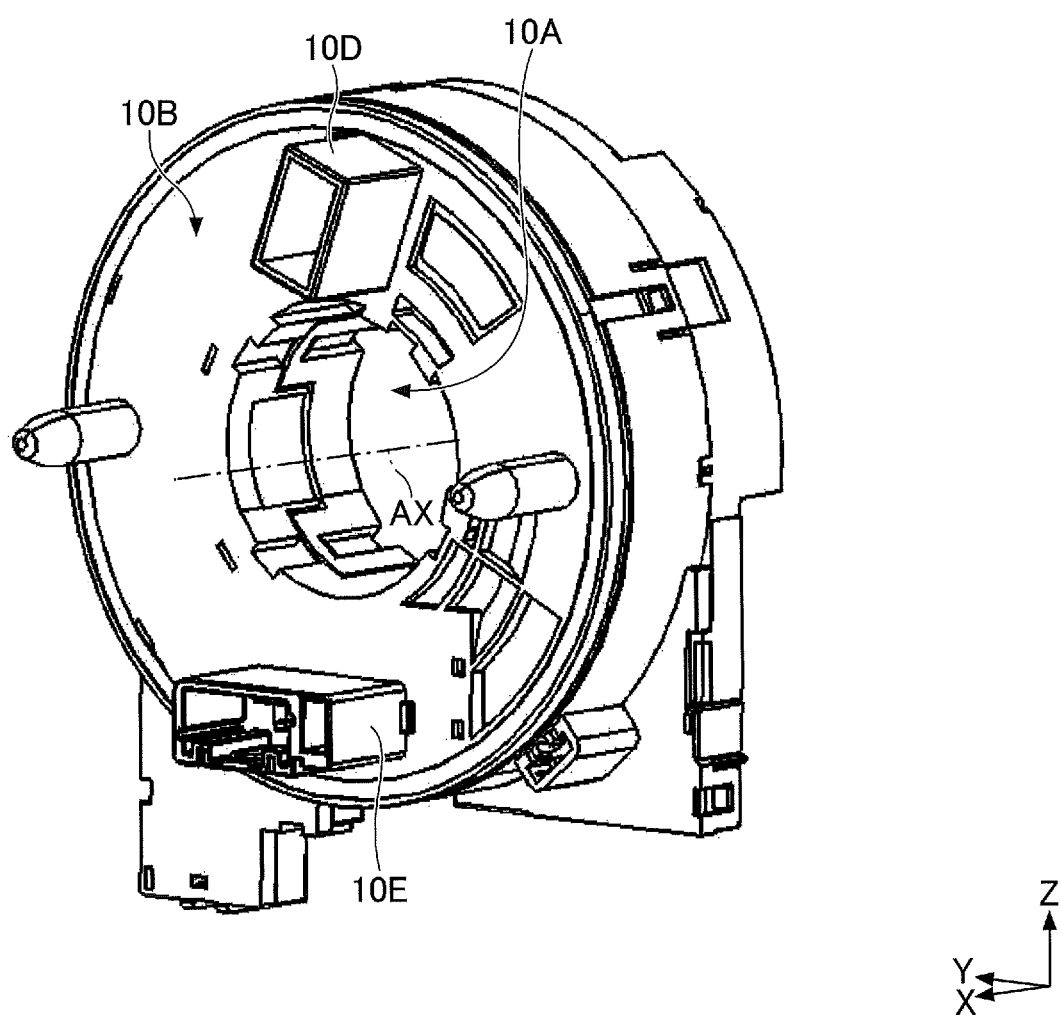
FIG. 1 is a perspective view of a rotary connector (steering wheel side) according to a first embodiment.
Figure 2:
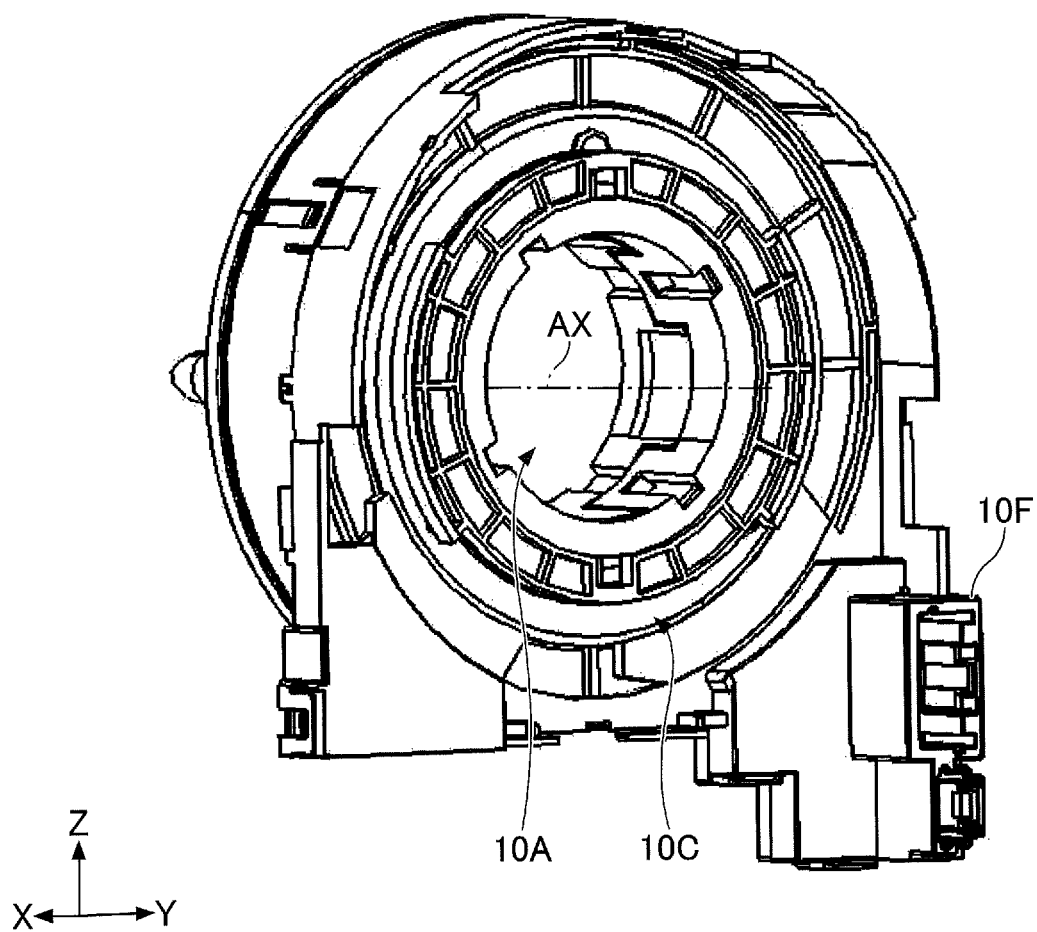
FIG. 2 is a perspective view of the rotary connector (vehicle body side) according to the first embodiment.

FIG. 1 is a perspective view of a rotary connector 10 (a side facing a steering wheel 12) according to the first embodiment. FIG. 2 is a perspective view of the rotary connector 10 (a side facing a vehicle body 14) according to the first embodiment.

The rotary connector 10 illustrated in FIGS. 1 and 2 is included in a steering device 20 (see FIG. 3) of a vehicle such as an automobile and electrically connects various electric components (such as paddle switches, operation switches, airbags, detection sensors, vibration generators, and heaters) that are examples of "steering-side electric components" provided in the steering wheel 12 (see FIG. 3) to various electric components (such as an ECU) that are examples of "vehicle-side electric components" provided in the vehicle body 14 (see FIG. 3).

As illustrated in FIGS. 1 and 2, the entire rotary connector 10 is substantially shaped like a thin cylinder. In the center of the rotary connector 10, a cylindrical through hole 10A extending along a rotation center axis AX (an example of "rotational axis") is formed. A steering shaft 16 is inserted into the through hole 10A.

The rotary connector 10 has a connection surface 10B and a connection surface 10C. The connection surface 10B is a connection surface facing the steering wheel 12 (+X axis side in the drawing). The connection surface 10B forms the front surface of a flat plate part 112 and has a substantially circular shape. The center portion of the connection surface 10B has a circular opening of the through hole 10A. On the connection surface 10B, a connector 10D (an example of "first connector") and a connector 10E are provided to protrude toward the steering wheel 12 (in the +X axis direction in the drawings). The connector 10D and the connector 10E are connected to steering-side electric components.

The connection surface 10C is a connection surface facing the vehicle body 14 (−X axis side in the drawing), and is fixed to the vehicle body 14 via a fixing part (not shown). The connection surface 10C has a substantially circular shape, and the center portion of the connection surface 10C has a circular opening of the through hole 10A. On the connection surface 10C, a connector 10F is provided to protrude downward (−Z axis direction in the drawings). The connector 10F is connected to a vehicle-side electric component.

The connector 10D and the connector 10E provided on the connection surface 10B and the connector 10F provided on the connection surface 10C are electrically connected to each other by a flexible printed circuit (FPC) unit 130 (see FIG. 4) provided inside of the rotary connector 10. In the following, the flexible printed circuit (FPC) is simply referred to as FPC.

(Method of Assembling Steering Device 20)

Figure 3A:
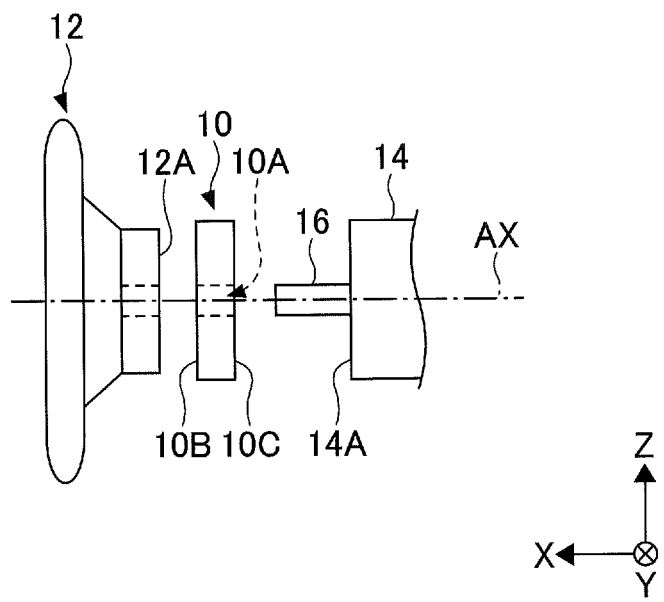
FIG. 3A is a drawing illustrating a method of assembling a steering device according to the first embodiment.
Figure 3B:
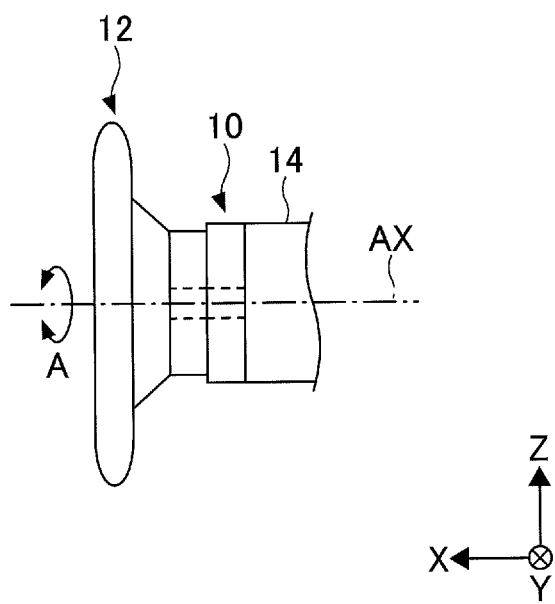
FIG. 3B is a drawing illustrating a method of assembling the steering device according to the first embodiment.

FIG. 3A and FIG. 3B are drawings illustrating a method of assembling the steering device 20 according to the first embodiment. As illustrated in FIGS. 3A and 3B, the steering device 20 includes the rotary connector 10, the steering wheel 12, the vehicle body 14, and the steering shaft 16. The steering shaft 16 is a round rod-shaped component that extends from the vehicle body 14 along the rotation center axis AX toward the steering wheel 12 in the +X axis direction.

In the steering device 20, the steering shaft 16 is inserted into the through hole 10A of the rotary connector 10 in the direction of the rotation center axis AX. The rotary connector 10 is statically attached to the vehicle body 14 such that the connection surface 10C contacts a connection surface 14A of the vehicle body 14. In this state, the connector 10F provided on the connection surface 10C is connected to a connector 14B provided on the vehicle body 14 (see FIG. 5). Thus, the rotary connector 10 is electrically connected to the vehicle-side electric component(s).

Also, the steering wheel 12 is statically attached to the rotary connector 10 such that the connection surface 10B engages with a connection surface 12A of the steering wheel 12. In this state, the connectors 10D and 10E provided on the connection surface 10B are connected, respectively, to two connectors 12B and 12C (see FIG. 5) provided on the steering wheel 12. Accordingly, the rotary connector 10 is electrically connected to the steering-side electric component(s).

The rotary connector 10 is configured such that the connection surface 10B is rotatable around the rotation center axis AX (in the direction of an arrow A in the drawing) with respect to the connection surface 100 of a case 140. With this configuration, when the steering wheel 12 is rotated in a state where the rotary connector 10 is incorporated in the steering device 20, the connection surface 10B to which the steering wheel 12 is attached can be rotated together with the steering wheel 12 while the connection surface 100 is fixed to the vehicle body 14. Thus, the rotary connector 10 can electrically connect the steering-side electric component(s) to the vehicle-side electric component(s) without preventing the rotating operation of the steering wheel 12.

(Configuration of Rotary Connector 10)

Figure 4:
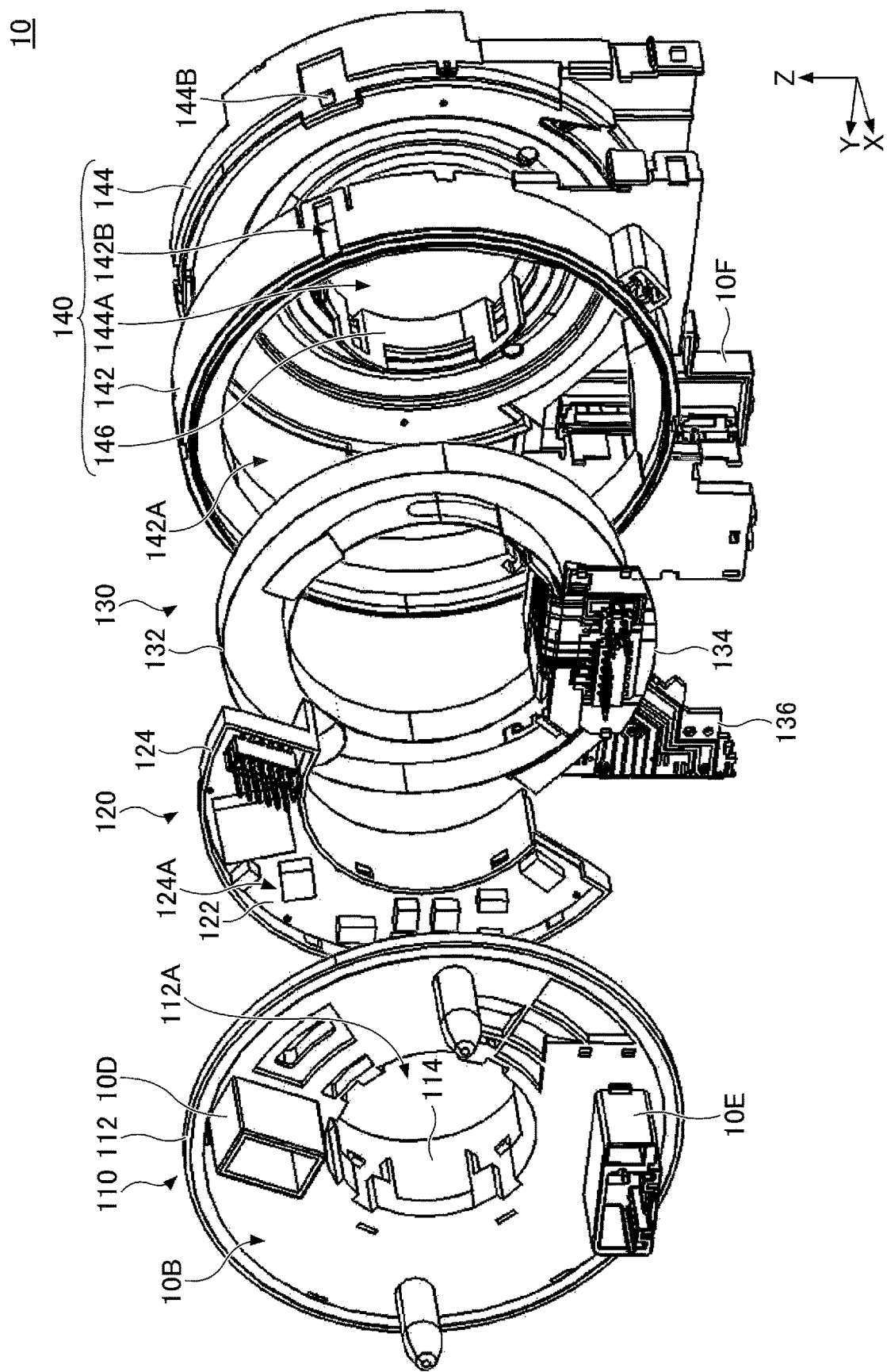
FIG. 4 is an exploded perspective view of the rotary connector according to the first embodiment.

FIG. 4 is an exploded perspective view of the rotary connector 10 according to an embodiment. As illustrated in FIG. 4, the rotary connector 10 includes a rotor 110, a control unit 120, an FPC unit 130, and a case 140.

The rotor 110 is a component to which the steering wheel 12 is attached and rotates together with the steering wheel 12. The rotor 110 includes a flat plate part 112 and a shaft 114. The flat plate part 112 is a disc-shaped part that extends in a direction orthogonal to the rotation center axis AX. The front surface of the flat plate part 112 serves as the connection surface 10B of the rotary connector 10. That is, the connectors 10D and 10E are provided on the front surface of the flat plate part 112 that serves as the connection surface 10B. A circular opening 112A is formed in the center of the flat plate part 112. The shaft 114 is a cylindrical part provided on the back surface of the flat plate part 112 to protrude from the periphery of the opening 112A toward the vehicle body 14 (in the −X axis direction in the drawing). The steering shaft 16 is inserted into the inner cylindrical part of the shaft 114. Thus, the shaft 114 functions as a rotation shaft of the rotor 110. The shaft 114 engages with a rotor snap 146 that is rotatably disposed in the case 140. With this configuration, the rotor 110 can be rotatably attached to the case 140 while closing the opening of the case 140 (case body 142) on the side facing the steering wheel 12 (+X axis side in the drawing) with the flat plate part 112.

The control unit 120 is an example of a "controller". The control unit 120 includes a control circuit 122 and a cover 124. The control circuit 122 is disposed between the connector 10D provided on the rotor 110 and the FPC 132 included in the FPC unit 130, and performs predetermined processes on electric signals transmitted between the connector 10D and the FPC 132 (i.e., electric signals input and output to and from the steering-side electric component). Examples of "predetermined processes" include, but are not limited to, an analog-digital conversion process, a voltage conversion process, and a filtering process. The cover 124 is a substantially box-shaped component having a bottom surface and an opening for covering the control circuit 122 and holds the control circuit 122 in its internal space. The cover 124 includes a holding space 124A for holding the control circuit 122. The cover 124 holding the control circuit 122 in the holding space 124A is attached to the back surface of the flat plate part 112 of the rotor 110 (a surface facing a housing space 142A of the case 140, which may be hereafter referred to as a "back surface of the rotor 110"). Thus, the control circuit 122 is held by the cover 124 and attached to the back surface of the rotor 110 together with the cover 124.

Details of the configuration of the control unit 120 are described later with reference to FIGS. 6 and 7.

The FPC unit 130 includes the FPC 132, a terminal 134, and a terminal 136. The FPC 132 is a flexible strip-shaped wiring component that is formed by covering surfaces of a strip-shaped conductor wire (for example, copper foil) with a flexible and insulating material (for example, polyimide resin or polyethylene terephthalate (PET)). The FPC 132 is placed in the housing space 142A of the case 140 in a wound state, and electrically connects the connector 10D (an example of "first connector") and the connector 10E provided on the rotor 110 to the connector 10F provided on the case 140. The terminal 134 is provided at one end of the FPC 132 and is connected to each of the connectors 10D and 10E. However, the terminal 134 is connected to the connector 10D via the control circuit 122 of the control unit 120. With the terminal 134 connected to each of the connectors 10D and 10E, the FPC 132 is electrically connected to the steering-side electric components via the connectors 10D and 10E. The terminal 136 is provided at another end of the FPC 132 and is connected to the connector 10F. With the terminal 136 connected to the connector 10F, the FPC 132 is electrically connected to the vehicle-side electric component via the terminal 136 and the connector 10F. Details of the configuration of the FPC unit 130 are described later with reference to FIGS. 8 and 9.

The case 140 includes the case body 142, the case cover 144, and the rotor snap 146. The case body 142 is a substantially cylindrical component that is fixed to the vehicle body. The case body 142 includes the housing space 142A. The FPC unit 130 is housed in the housing space 142A. The opening of the case body 142 on the side facing the steering wheel 12 (+X axis side in the drawing) is closed by the flat plate part 112 of the rotor 110 that is rotatably attached to the case 140. The case cover 144 is a lid-like component having a substantially disc shape and closes the opening of the case body 142 on the side facing the vehicle body 14 (−X axis side in the drawing). The front surface of the case cover 144 serves as the connection surface 10B of the rotary connector 10. On the periphery of the case cover 144, multiple claw-shaped engaging parts 144B are provided. The engaging parts 144B are fitted into openings 142B formed in the outer wall of the case body 142. As a result, the case cover 144 is statically joined to the case body 142. A circular opening 144A is formed in the center of the case cover 144. The rotor snap 146 is provided so as to be rotatable with respect to the opening 144A of the case cover 144. The steering shaft 16 is inserted into the inner cylindrical part of the rotor snap 146. Also, the rotor snap 146 engages with the shaft 114 of the rotor 110 and is thereby joined to the rotor 110. Accordingly, the rotor snap 146 becomes rotatable together with the rotor 110 relative to the case cover 144. In practice, although omitted in the drawings, multiple rollers for guiding the winding operation and the unwinding operation of the FPC 132 resulting from the rotating operation of the steering wheel 12 and a roller holder for rotatably holding the rollers are provided in the housing space 142A of the case body 142 in addition to the FPC 132.

(Electrical Connection Configuration of Rotary Connector 10)

Figure 5:
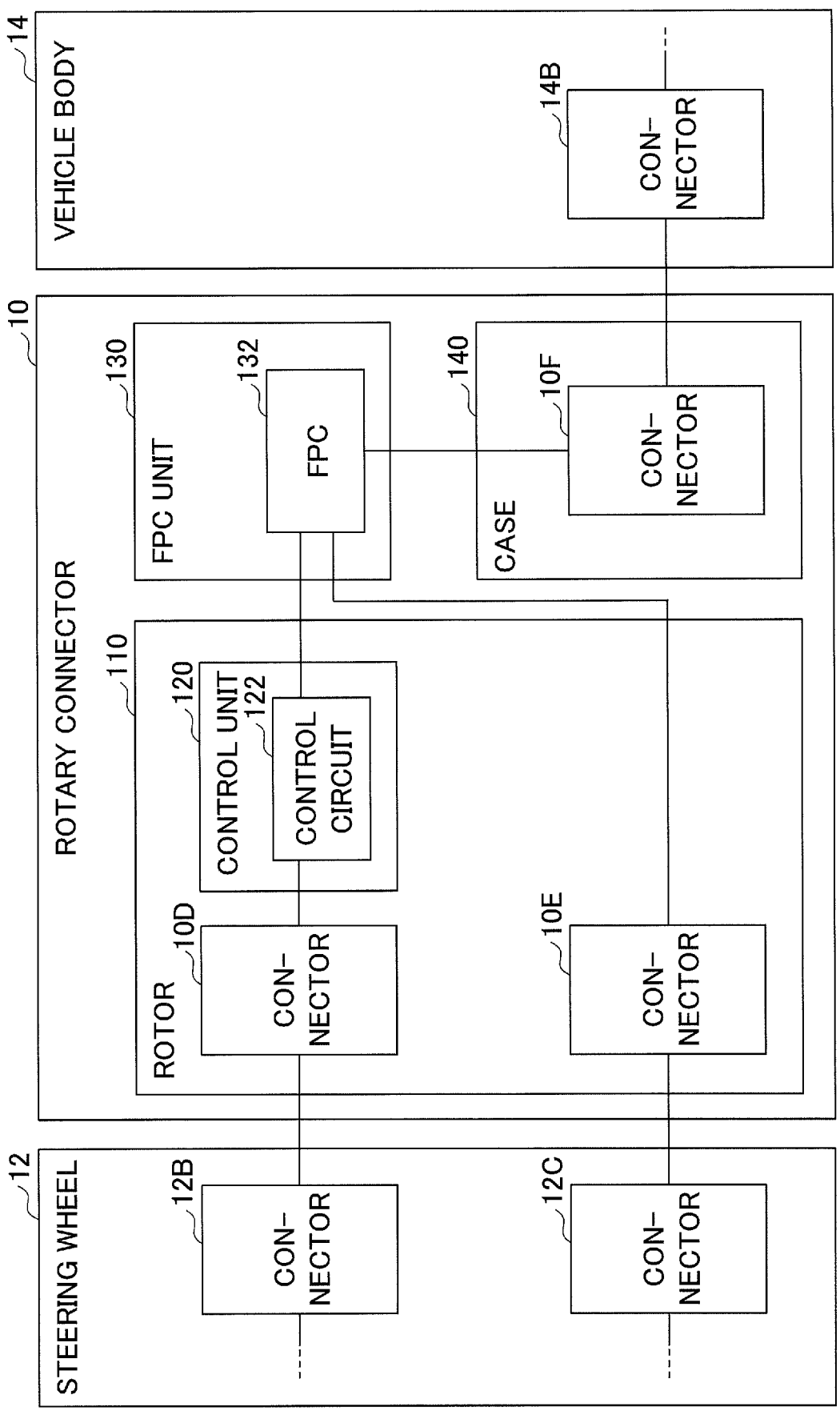
FIG. 5 is a drawing illustrating an electrical connection configuration of the rotary connector according to the first embodiment.

FIG. 5 is a drawing illustrating an electrical connection configuration of the rotary connector 10 according to the first embodiment.

As illustrated in FIG. 5, the rotor 110 of the rotary connector 10 includes the connectors 10D and 10E. Each of the connectors 10D and 10E is an example of "a first connector electrically connected to the steering wheel side". The connector 10D is connected to the connector 12B provided on the steering wheel 12. The connector 10E is connected to the connector 12C provided on the steering wheel 12. The connectors 12B and 12C are electrically connected to the steering-side electric components.

Also, the connector 10F is provided in the case 140 of the rotary connector 10. The connector 10F is an example of "a second connector electrically connected to the vehicle body side". The connector 10F is connected to the connector 14B provided on the vehicle body 14. The connector 14B is electrically connected to the vehicle-side electric component.

Also, in the rotary connector 10, the connectors 10D and 10E are electrically connected to the connector 10F via the FPC 132 in the FPC unit 130. Here, the control circuit 122 of the control unit 120 is provided between the connector 10D and the FPC 132. The control circuit 122 performs a predetermined process (for example, an analog-digital conversion process, a voltage conversion process, or a filtering process) on an electric signal transmitted between the connector 10D and the FPC 132.

That is, steering-side electric components whose input and output electric signals need to be processed by the control circuit 122 are connected to the connector 10D, and other steering-side electric components are connected to the connector 10E.

As illustrated in FIG. 5, in the rotary connector 10 of the first embodiment, the control circuit 122 is disposed closer to the steering wheel 12 than the FPC 132. With this configuration, the rotary connector 10 of the first embodiment, for example, can perform analog-digital conversion on an electric signal (analog signal) output from a steering-side electric component via the connector 10D by using the control circuit 122 disposed in front of the FPC 132. That is, the rotary connector 10 can transmit an electric signal output from a steering-side electric component via the FPC 132 to a vehicle-side electric component after converting the electric signal into a digital signal. Accordingly, the rotary connector 10 of the first embodiment can suppress the influence of noise on an electric signal output from a steering-side electric component and passing through the FPC 132. Also, a signal that has already been digitized or an analog signal that does not need to be digitized may be input via the connector 10E and transmitted to the vehicle-side electric component without being caused to pass through the control circuit 122.

(Configuration of Control Unit 120)

Figure 6:
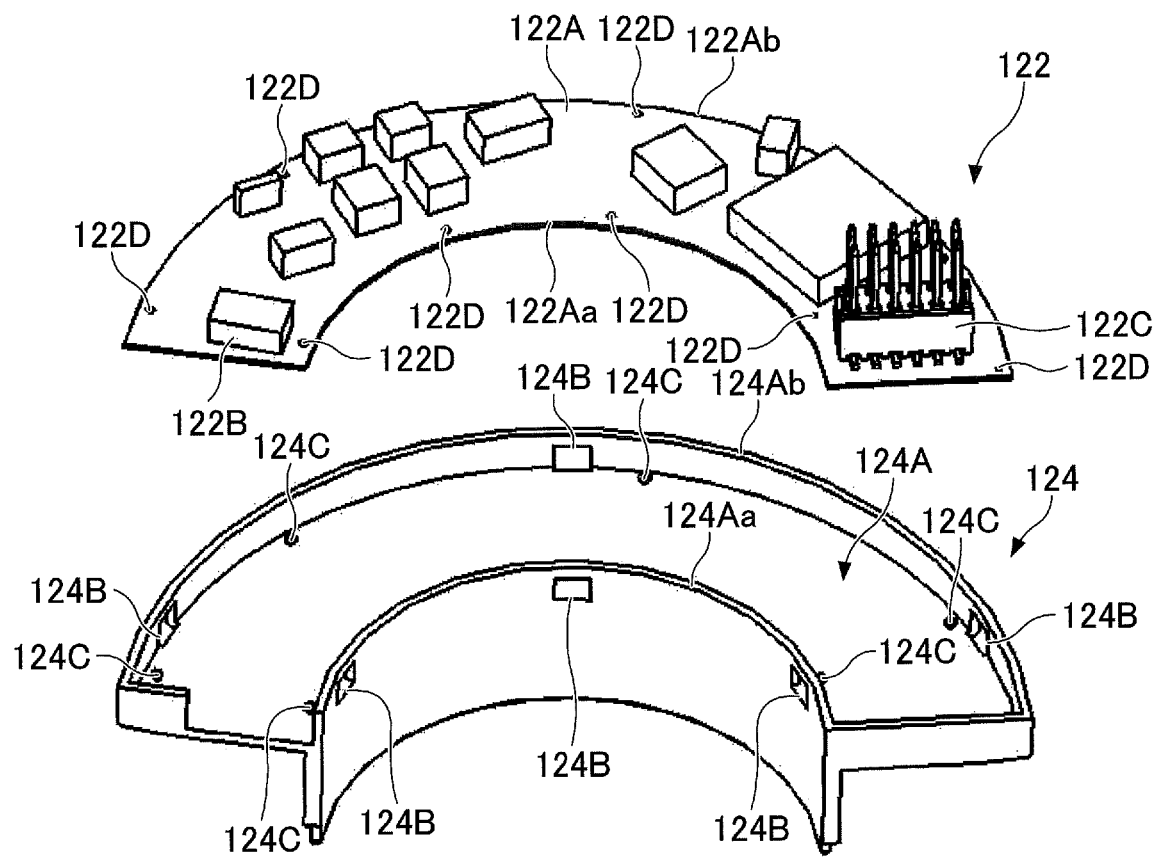
FIG. 6 is a perspective view illustrating a configuration (disassembled state) of a control unit according to the first embodiment.

FIG. 6 is a perspective view illustrating a configuration (disassembled state) of the control unit 120 according to the first embodiment. FIG. 7 is a perspective view illustrating a configuration (assembled state) of the control unit 120 according to the first embodiment.

Figure 7:
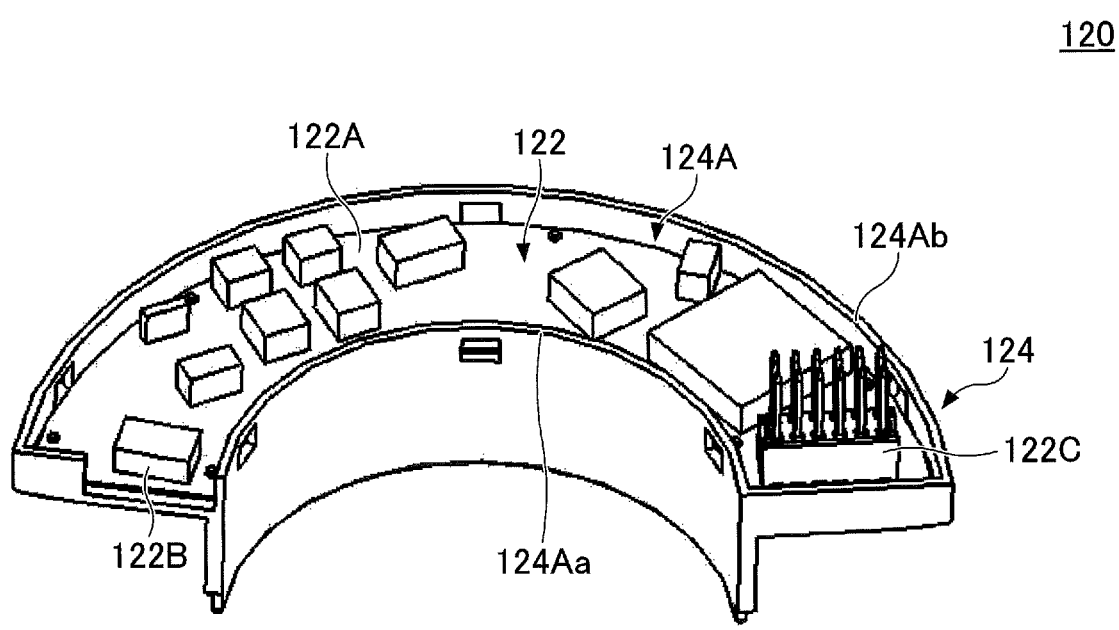
FIG. 7 is a perspective view illustrating a configuration (assembled state) of the control unit according to the first embodiment.

As illustrated in FIGS. 6 and 7, the control unit 120 includes the control circuit 122 and the cover 124.

The control circuit 122 is disposed between the connector 10D provided on the rotor 110 and the FPC 132 included in the FPC unit 130, and is an electric circuit that can perform a predetermined process(es) (for example, an analog-digital conversion process, a voltage conversion process, or a filtering process) on an electric signal transmitted between the connector 10D and the FPC 132.

The control circuit 122 includes a circuit board 122A. In the first embodiment, an FPC is used as the circuit board 122A so that the thickness of the control circuit 122 can be reduced. Also, using an FPC as the circuit board 122A makes it easier to connect the control circuit 122 to a relay FPC 138 that is also implemented by an FPC. The circuit board 122A has a fan shape in plan view. An inner periphery 122Aa of the circuit board 122A is curved along the inner periphery of the back surface of the rotor 110 (i.e., the periphery of the opening 112A). An outer periphery 122Ab of the circuit board 122A is curved along the outer periphery of the back surface of the rotor 110. With this configuration, the control circuit 122 can be attached to a predetermined installation area on the back surface of the rotor 110 between the inner periphery of the back surface and the outer periphery of the back surface such that the control circuit 122 does not protrude from the installation area. Multiple holes 122D are formed in the circuit board 122A along its outer periphery.

A connector 122B is provided on one end of the circuit board 122A. The relay FPC 138, which extends from the terminal 134 provided at one end of the FPC 132, is connected to the connector 122B. That is, one end of the FPC 132 is connected to the connector 122B via the terminal 134 and the relay FPC 138.

A connecting terminal 122C is provided on the other end of the circuit board 122A. The connecting terminal 122C includes multiple pin terminals that are upright with respect to the circuit board 122A. The pin terminals pass through the rotor 110 and are placed in the connector 10D provided on the rotor 110. That is, the pin terminals of the connecting terminal 122C are combined with the connector 10D and are electrically connected to the connector 12B provided on the steering wheel 12.

On the circuit board 122A, multiple circuit components are disposed between the connector 122B and the connecting terminal 122C. With the circuit components, the control circuit 122 can perform predetermined processes (such as an analog-digital conversion process, a voltage conversion process, and a filtering process) on an electric signal transmitted between the connector 122B and the connecting terminal 122C (i.e., an electric signal transmitted between the connector 10D and the FPC 132).

The cover 124 is a component that covers the back surface and the side surfaces of the control circuit 122 and enables the control circuit 122 to be attached to the rotor 110. The cover 124 includes the holding space 124A for holding the control circuit 122. The holding space 124A has a fan shape, which is substantially the same as the shape of the control circuit 122, in plan view. Accordingly, as illustrated in FIG. 7, the holding space 124A can house the control circuit 122 without a gap. An inner peripheral wall 124Aa of the holding space 124A is curved along the inner periphery of the back surface of the rotor 110 (i.e., the periphery of the opening 112A). An outer peripheral wall 124Ab of the holding space 124A is curved along the outer periphery of the back surface of the rotor 110. With this configuration, the cover 124 housing the control circuit 122 in the holding space 124A can be attached to a predetermined installation area on the back surface of the rotor 110 between the inner periphery of the back surface and the outer periphery of the back surface so as not to protrude from the installation area. Multiple protrusions 124C are formed on the bottom surface of the holding space 124A of the cover 124 along its outer periphery. Also, multiple openings 124B are formed in the inner peripheral wall 124Aa and the outer peripheral wall 124Ab of the cover 124.

(Configuration of FPC Unit 130)

Figure 8:
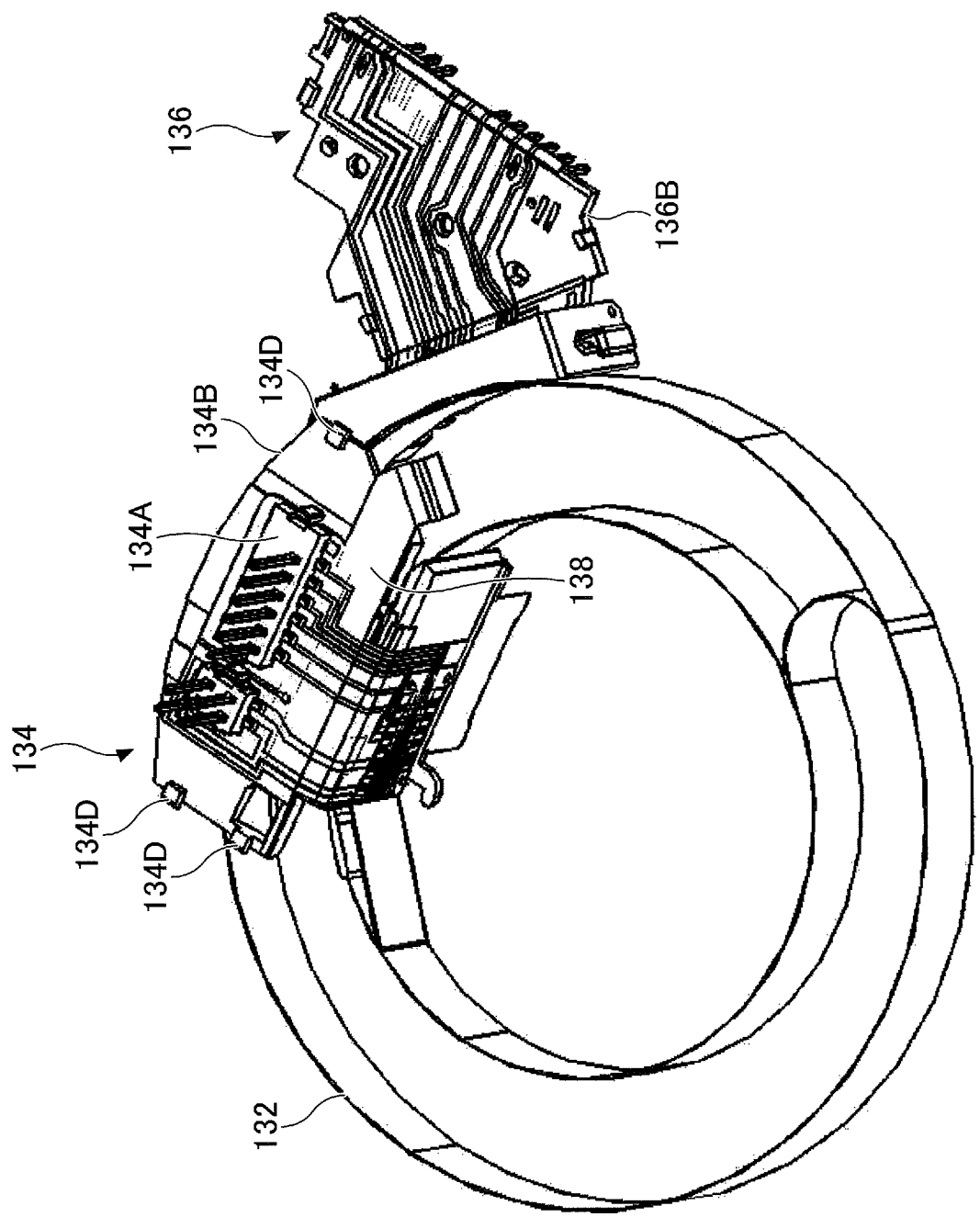
FIG. 8 is a perspective view illustrating a configuration of an FPC unit according to the first embodiment.
Figure 9:
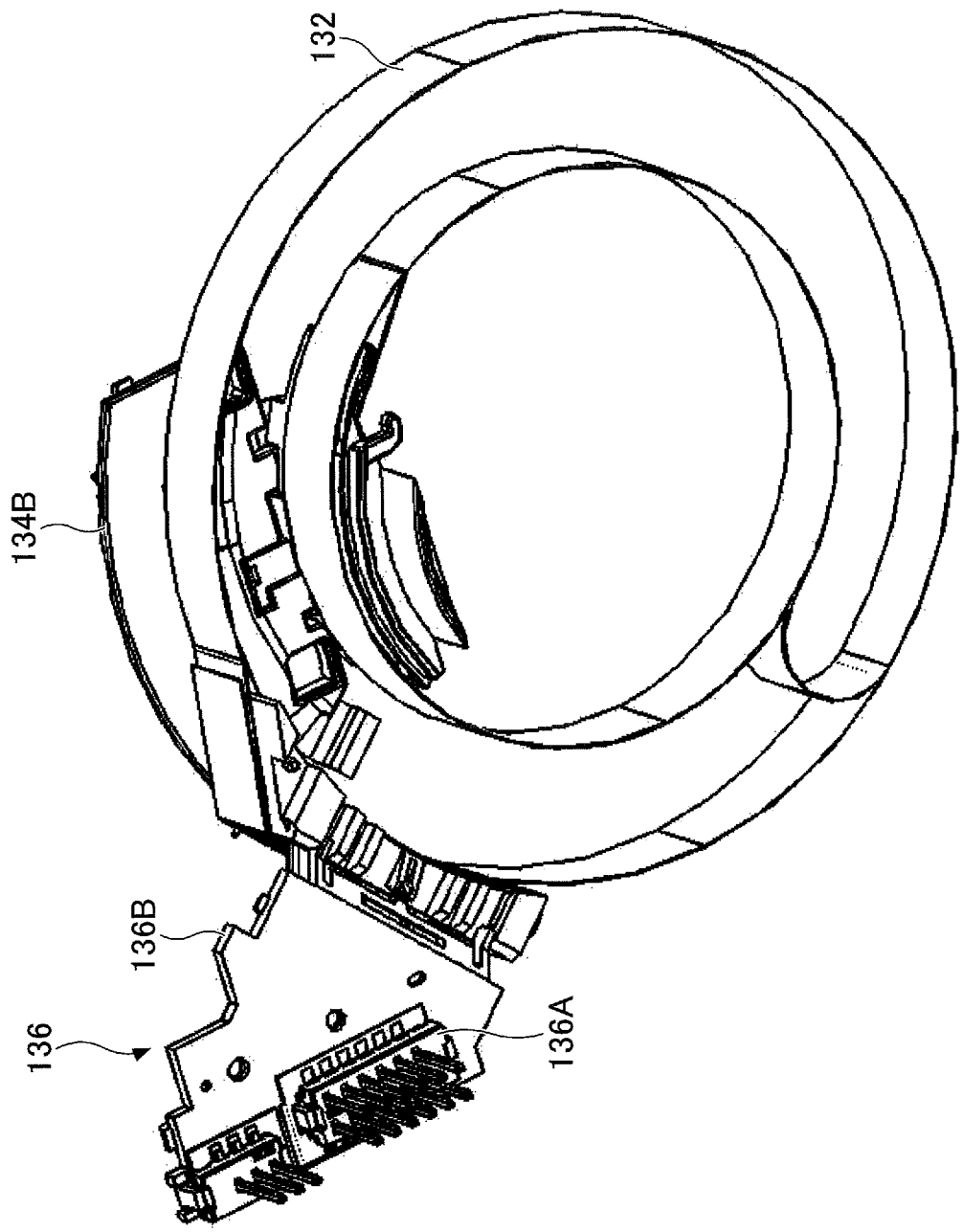
FIG. 9 is a perspective view illustrating a configuration of the FPC unit according to the first embodiment.

FIGS. 8 and 9 are perspective views illustrating a configuration of the FPC unit 130 according to the first embodiment. FIG. 8 is a drawing illustrating the FPC unit 130 seen from the steering wheel 12. FIG. 9 is a drawing illustrating the FPC unit 130 seen from the vehicle body 14.

As illustrated in FIGS. 8 and 9, the FPC unit 130 includes the FPC 132, the terminal 134, the terminal 136, and the relay FPC 138.

The FPC 132 is placed in the housing space 142A of the case 140 in a wound state. The FPC 132 is wound and unwound in the housing space 142A according to the rotating operation of the steering wheel 12.

The terminal 134 is provided at one end of the FPC 132 (an end facing the steering wheel 12). The terminal 134 includes a connecting terminal 134A and a holder 134B.

The connecting terminal 134A includes multiple upright pin terminals that pass through the rotor 110 and are placed in the connector 10E provided on the rotor 110. That is, the pin terminals of the connecting terminal 134A are combined with the connector 10E and electrically connected to the connector 10E provided on the rotor 110. Accordingly, the connecting terminal 134A is electrically connected to the steering-side electric component(s).

The holder 134B is a component that supports one end of the FPC 132 and connecting terminal 134A. The holder 134B is statically attached to the back surface of the rotor 110 while supporting the one end of the FPC 132 and the connecting terminal 134A.

The terminal 136 is provided at another end of the FPC 132 (an end facing the vehicle body 14). The terminal 136 includes a connecting terminal 136A and a holder 136B.

The connecting terminal 136A includes multiple upright pin terminals that pass through the case cover 144 and are placed in the connector 10F provided on the case cover 144. That is, the pin terminals of the connecting terminal 136A are combined with the connector 10F and electrically connected to the connector 14B provided on the vehicle body 14. Accordingly, the connecting terminal 136A is electrically connected to the vehicle-side electric component.

The holder 136B is a component that supports another end of the FPC 132 and the connecting terminal 136A. The holder 134B is statically attached to the back surface of the case cover 144 (the surface facing the housing space 142A) while supporting the other end of the FPC 132 and the connecting terminal 136A.

One end of the relay FPC 138 is connected to one end of the FPC 132, and another end of the relay FPC 138 is connected to the connector 122B of the control circuit 122. Thus, the relay FPC 138 electrically connects the FPC 132 to the control circuit 122. In the first embodiment, an FPC is used as the relay FPC 138 so that the thickness of the relay FPC 138 can be reduced. Also, because the relay FPC 138 is implemented by an FPC similarly to the FPC 132 and the circuit board 122A of the control circuit 122, the relay FPC 138 can be easily connected to the FPC 132 and the control circuit 122.

(FPC 132 and Control Circuit 122 in Connected State)

Figure 10:
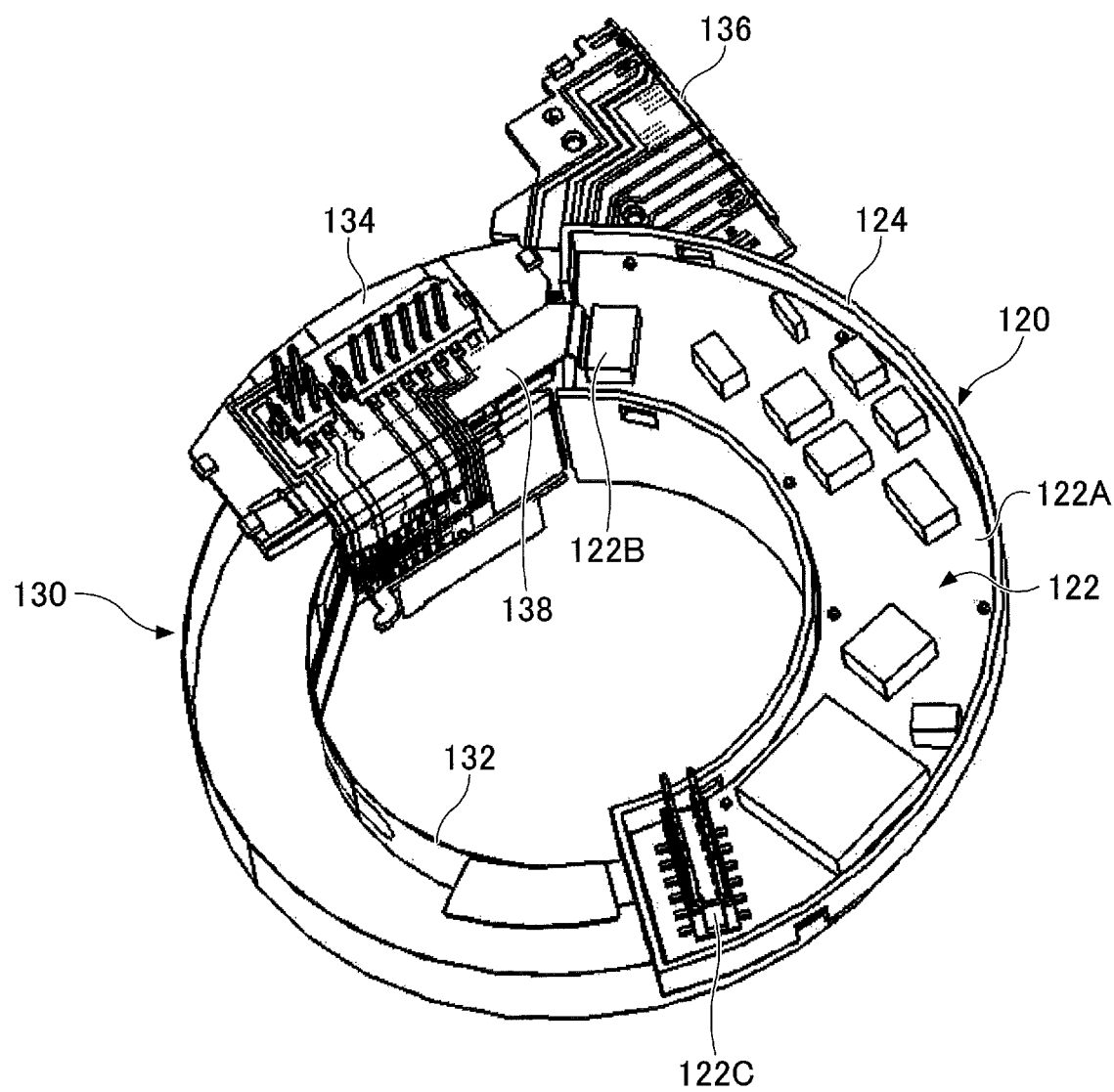
FIG. 10 is a drawing illustrating a state where an FPC and a control circuit according to the first embodiment are connected to each other.

FIG. 10 is a drawing illustrating a state where the FPC 132 and the control circuit 122 of the first embodiment are connected to each other. As illustrated in FIG. 10, the relay FPC 138 extending from the terminal 134 provided at one end of the FPC 132 is connected to the connector 122B of the control circuit 122. Thus, the FPC 132 is electrically connected to the control circuit 122 via the relay FPC 138.

(Method of Attaching Control Unit 120)

Figure 11:
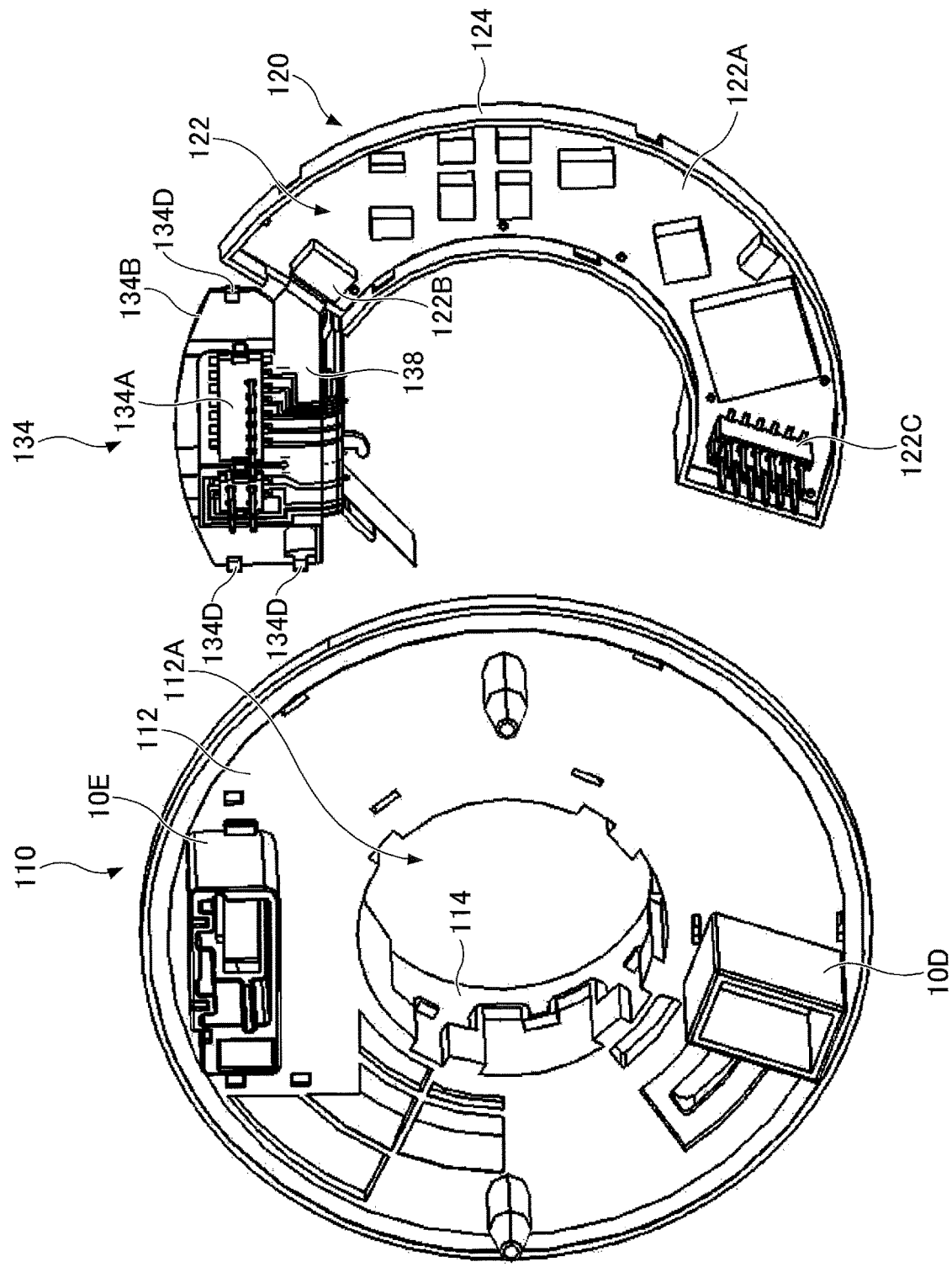
FIG. 11 is a drawing illustrating a method of attaching a control unit and a terminal to a rotor according to the first embodiment.
Figure 12:
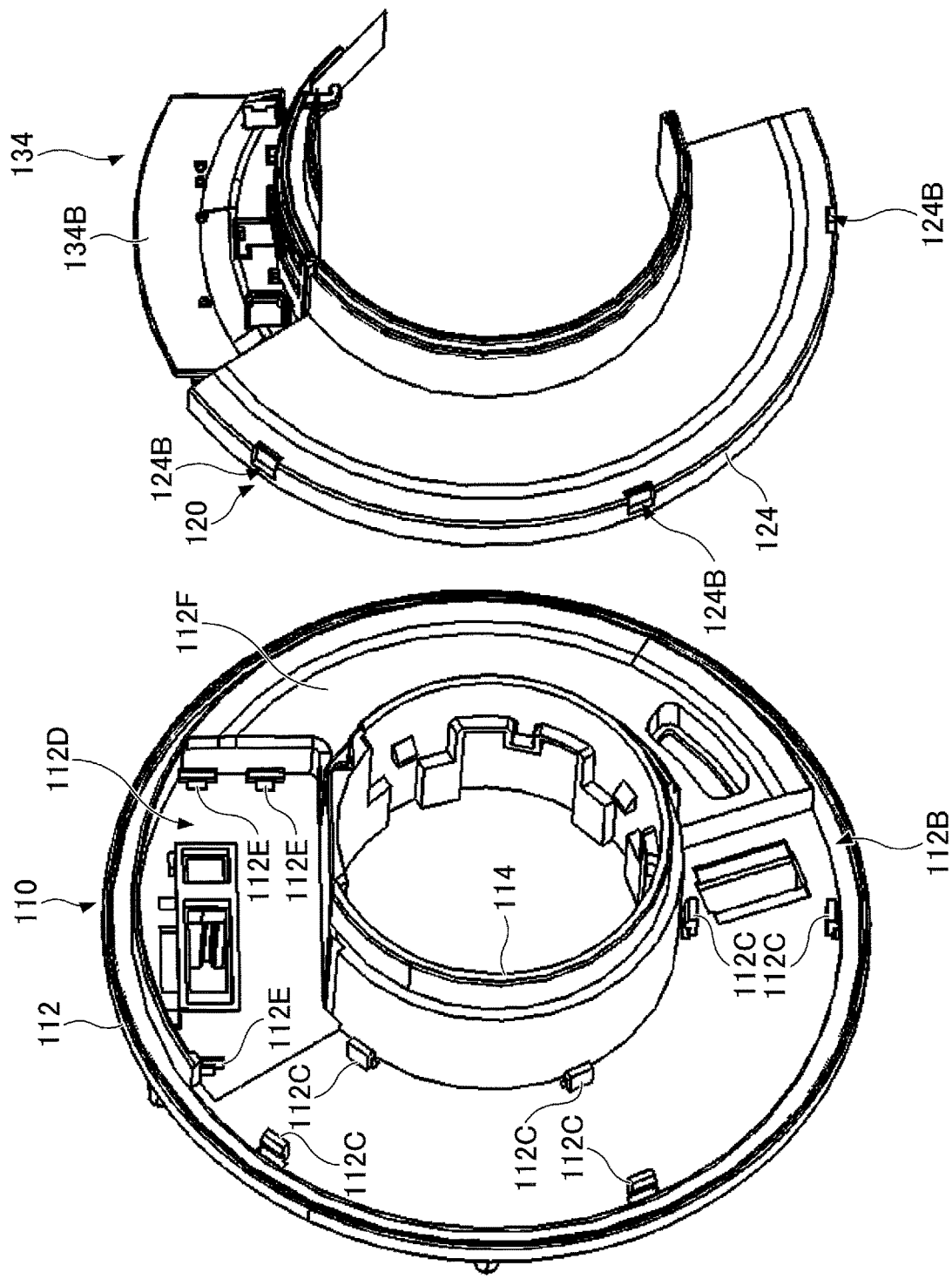
FIG. 12 is a drawing illustrating a method of attaching the control unit and the terminal to the rotor according to the first embodiment.
Figure 13:
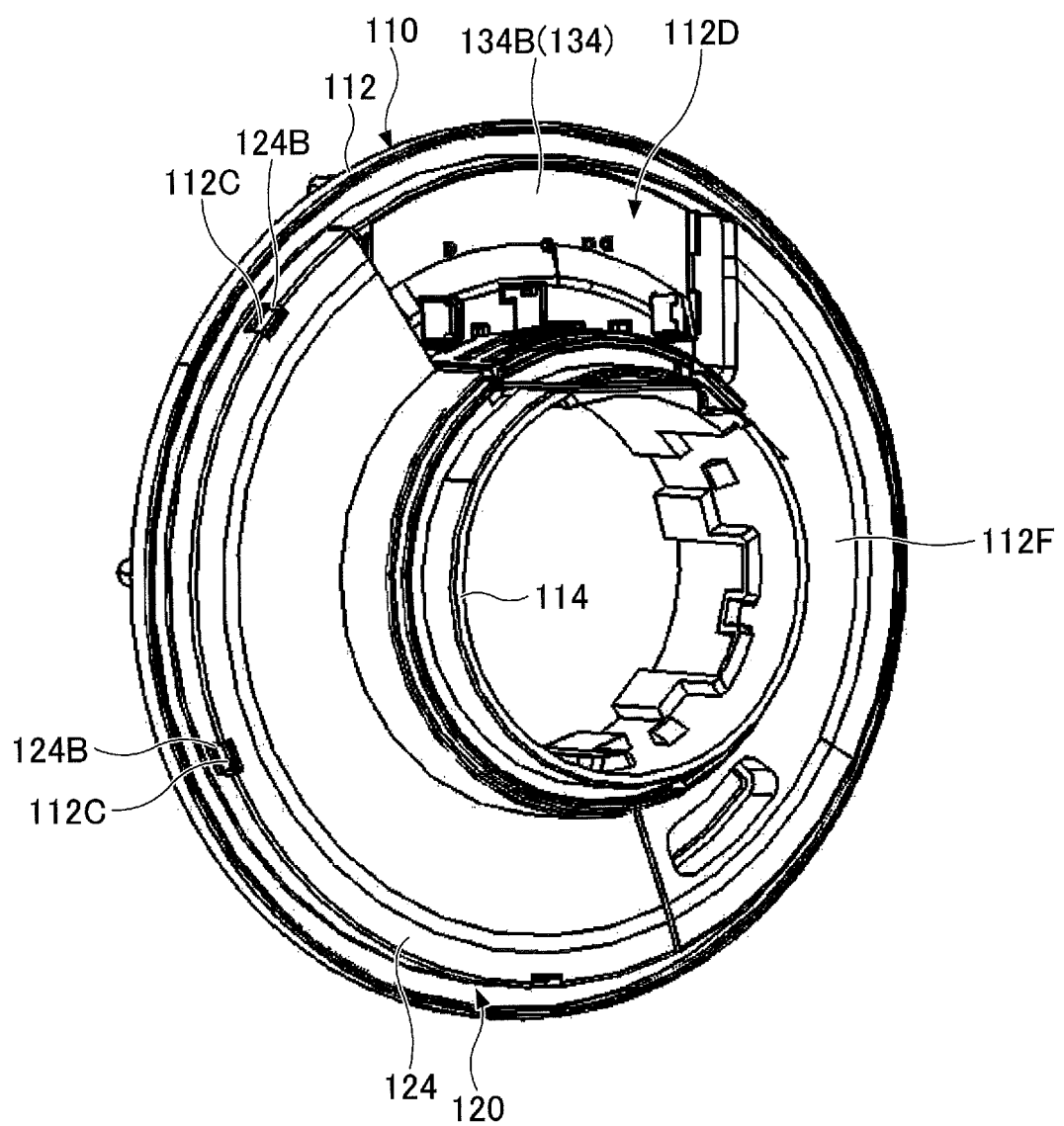
FIG. 13 is a drawing illustrating a method of attaching the control unit and the terminal to the rotor according to the first embodiment.

FIGS. 11 through 13 are drawings illustrating a method of attaching the control unit 120 and the terminal 134 to the rotor 110 according to the first embodiment. FIG. 11 is a drawing illustrating the rotor 110, the control unit 120, and the terminal 134 seen from the steering wheel 12. FIG. 12 is a drawing illustrating the rotor 110, the control unit 120, and the terminal 134 seen from the vehicle body 14. FIG. 13 is a drawing illustrating a state where the control unit 120 and the terminal 134 are attached to the rotor 110.

First, as illustrated in FIGS. 11 and 12, in the control unit 120, the control circuit 122 is placed in the holding space 124A of the cover 124. The holding space 124A has a fan shape that is substantially the same as the shape of the control circuit 122 in plan view seen in the direction of the rotation center axis AX. Accordingly, the holding space 124A can house the control circuit 122 without a gap.

The control circuit 122 is fixed in the holding space 124A with a fixing mechanism. As an example, in the first embodiment, the control circuit 122 is fixed in the holding space 124A by fitting the protrusions 124C protruding from the bottom surface of the holding space 124A into the corresponding holes 122D formed in the circuit board 122A and by riveting the protrusions 124C.

Next, as illustrated in FIGS. 11 and 12, the relay FPC 138 provided on the terminal 134 is connected to the connector 122B of the control circuit 122. The terminal 134 includes the holder 134B, and the holder 134B supports other components (the relay FPC 138 and the connecting terminal 134A).

Then, as illustrated in FIG. 13, the control unit 120 and the terminal 134 are attached to the back surface of the rotor 110.

Specifically, the cover 124 housing the control circuit 122 is fitted into a cutout space 112B (an example of a recess) formed on the back surface of the rotor 110 and having substantially the same shape as the cover 124 (i.e., a fan shape in plan view). Multiple claw-shaped engaging parts 112C are formed in the cutout space 112B, and the engaging parts 112C engage with the corresponding openings 124B formed in the cover 124. With this configuration, the control unit 120 is fixed to the cutout space 112B of the rotor 110. In this state, the pin terminals of the connecting terminal 122C provided on the control circuit 122 pass through the rotor 110 from the back side, and are placed in the connector 10D provided on the front surface of the rotor 110.

Also, the holder 134B of the terminal 134 is fitted into a cutout space 112D formed on the back surface of the rotor 110 and having substantially the same shape as the holder 134B. Multiple openings 112E are formed in the cutout space 112D, and the openings 112E engage with claw-shaped engaging parts 134D formed on the holder 134B. With this configuration, the terminal 134 is fixed to the cutout space 112D of the rotor 110. In this state, multiple pin terminals of the connecting terminal 134A provided in the terminal 134 pass through the rotor 110 from the back side and are placed in the connector 10E provided on the front surface of the rotor 110.

Here, a flat surface 112F is formed in a portion of the back surface of the rotor 110 excluding the cutout space 112B and the cutout space 112D. Also, the back surface (the surface facing the housing space 142A) of the cover 124 attached to the cutout space 112B is a substantially smooth flat surface. Also, the back surface (the surface facing the housing space 142A) of the holder 134B attached to the cutout space 112D is a substantially smooth flat surface.

Accordingly, as illustrated in FIG. 13, when the cover 124 is attached to the cutout space 112B, a smooth flat surface is formed in the cutout space 112B. Also, when the holder 134B is attached to the cutout space 112D, a smooth flat surface is formed also in the cutout space 112D.

Particularly, the back surface of the cover 124 is at the same height as the flat surface 112F. Accordingly, as illustrated in FIG. 13, a continuous flat surface composed of the flat surface 112F and the back surface of the cover 124 is formed on the back side of the flat plate part 112 of the rotor 110.

That is, in the rotary connector 10 of the first embodiment, a flat surface is formed on the entire back surface of the rotor 110 by attaching the cover 124 and the holder 134B to the back surface of the rotor 110. With this configuration, the rotary connector 10 of the first embodiment is slidable such that the cover 124 and the holder 134B on the back surface of the rotor 110 do not interfere with the FPC 132.

(Cross Section of Rotary Connector 10)

Figure 14:
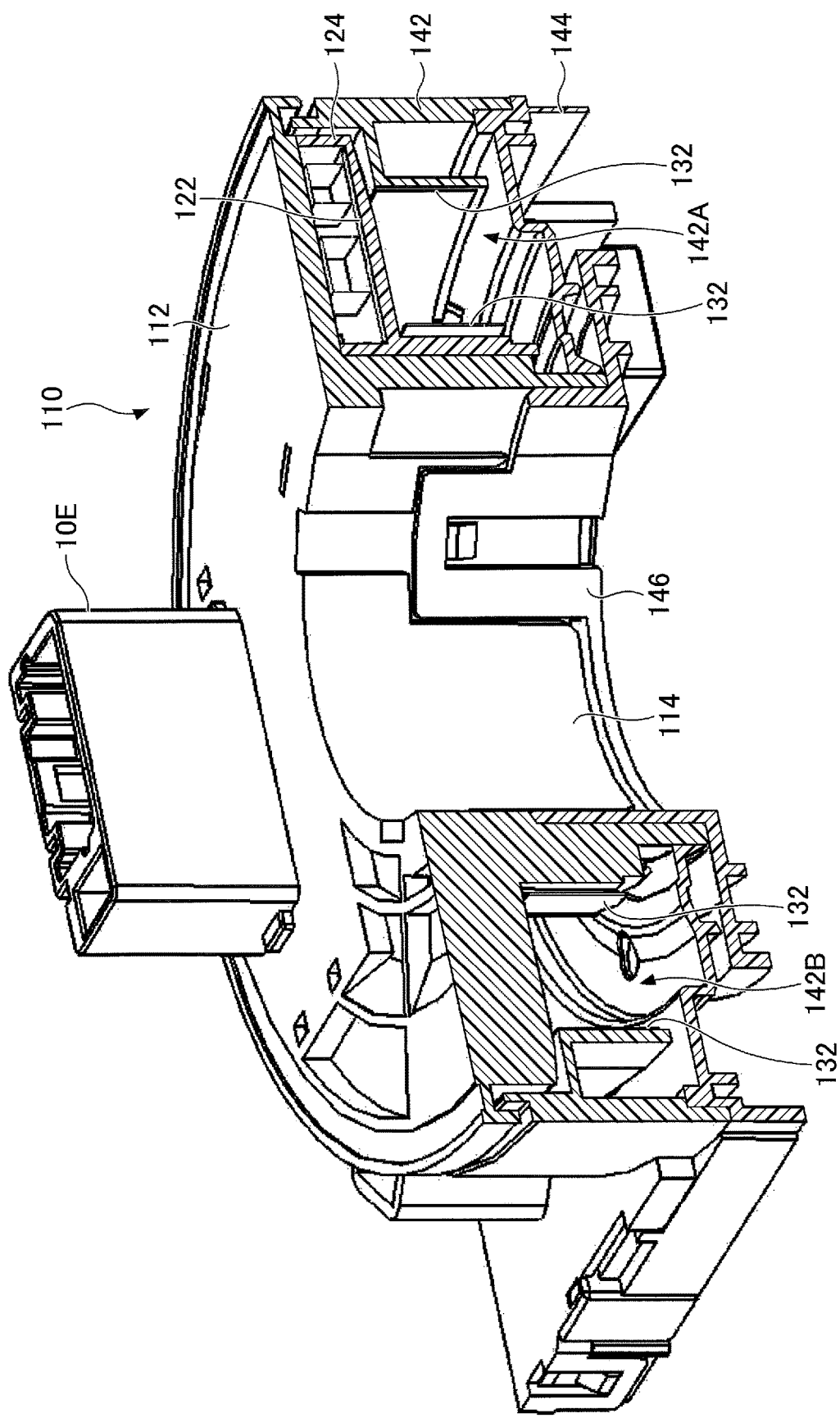
FIG. 14 is a cross-sectional view of the rotary connector according to the first embodiment.

FIG. 14 is a cross-sectional view of the rotary connector 10 according to the first embodiment. As illustrated in FIG. 14, in the rotary connector 10 of the first embodiment, the control unit 120 (the control circuit 122 and the cover 124) is attached to the back surface of the rotor 110 such that the control unit 120 does not protrude from the back surface of the rotor 110. With this configuration of the rotary connector 10 of the first embodiment, the control unit 120 can be installed in an empty space of the rotary connector 10 without affecting the outer shape and the outer size of the rotary connector 10, i.e., without increasing the size of the rotary connector 10.

The control unit 120 (the control circuit 122 and the cover 124) of the rotary connector 10 of the first embodiment is relatively thin. In the rotary connector 10 of the first embodiment, the cutout space 112B is formed on the back surface of the rotor 110, and the control unit 120 is provided in the cutout space 112B. This configuration makes it possible to suppress the increase in the thickness of the rotor 110 as a result of providing the control unit 120. Also, in the rotary connector 10 of the first embodiment, the surface of the cover 124 (the surface facing the housing space 142A) is made smooth so that the surface of the cover 124 does not interfere with the FPC 132.

Therefore, in the rotary connector 10 of the first embodiment, the control unit 120 does not interfere with the FPC 132 housed in the housing space 142A. In other words, the control unit 120 can be installed in the empty space of the rotary connector 10 such that the control unit 120 does not affect the winding operation and the unwinding operation of the FPC 132.

Therefore, according to the rotary connector 10 of the first embodiment, it is possible to implement a small rotary connector 10 capable of suppressing the influence of noise on the steering-side electric components.

As described above, the rotary connector 10 of the first embodiment is configured such that the control unit 120 is held on the flat plate part 112 of the rotor 110 facing the housing space 142A and can rotate together with the rotor 110. With this configuration of the rotary connector 10 of the first embodiment, the control unit 120 can be installed in an empty space in the rotary connector 10. Therefore, according to the rotary connector 10 of the first embodiment, it is possible to realize a small rotary connector 10 capable of suppressing the influence of noise on electric signals input and output to and from the steering wheel 12.

Particularly, in the rotary connector 10 of the first embodiment, the control unit 120 has a fan shape in plan view that extends along the inner periphery and the outer periphery of the surface of the rotor 110 facing the housing space 142A. With this configuration of the rotary connector 10 of the first embodiment, the size of the control unit 120 in the radial direction can be reduced compared with a case where the control unit 120 has another shape (for example, a general rectangular shape). Therefore, according to the rotary connector 10 of the first embodiment, the control unit 120 can be provided on the surface of the rotor 110 facing the housing space 142A without increasing the size of the rotor 110.

Also, in the rotary connector 10 of the first embodiment, the control unit 120 is provided with the cover 124 for covering the control circuit 122, and in particular, the surface of the cover 124 facing the housing space 142A is smooth and flat. With this configuration of the rotary connector 10 of the first embodiment, the FPC 132 is not interfered with the control unit 120. Thus, according to the rotary connector 10 of the first embodiment, it is possible to suppress the interference of the control unit 120 with the winding operation and the unwinding operation.

The rotary connector 10 of the first embodiment uses an FPC as the circuit board 122A of the control circuit 122. This configuration of the rotary connector 10 of the first embodiment can reduce the thickness of the control circuit 122 compared with a configuration in which another type of board (for example, a rigid board) is used as the circuit board 122A. Thus, the configuration of the rotary connector 10 of the first embodiment makes it possible to reduce the thickness of the control unit 120 and more effectively suppress the interference of the control unit 120 with the FPC 132.

Second Embodiment

Next, a second embodiment is described with reference to FIGS. 16 through 19. In the second embodiment, a rotary connector 30, which is a variation of the rotary connector 10 of the first embodiment, is described. Below, differences between the rotary connector 30 and the rotary connector 10 are mainly described. In the descriptions below, the same reference numbers as those of the rotary connector 10 are assigned to components corresponding to the components of the rotary connector 10, and detailed descriptions of those components are omitted.

Figure 16:
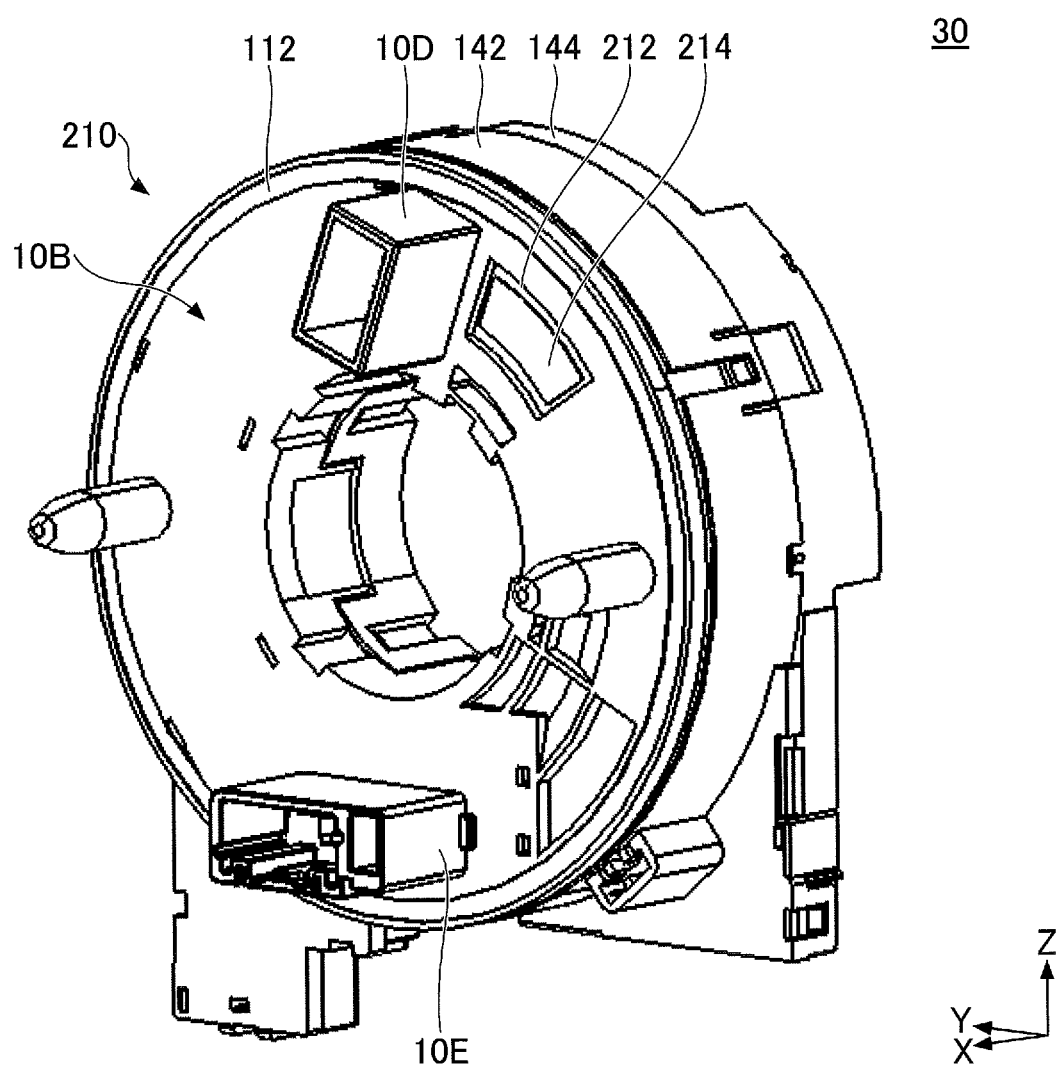
FIG. 16 is a perspective view of a rotary connector according to a second embodiment.
Figure 17:
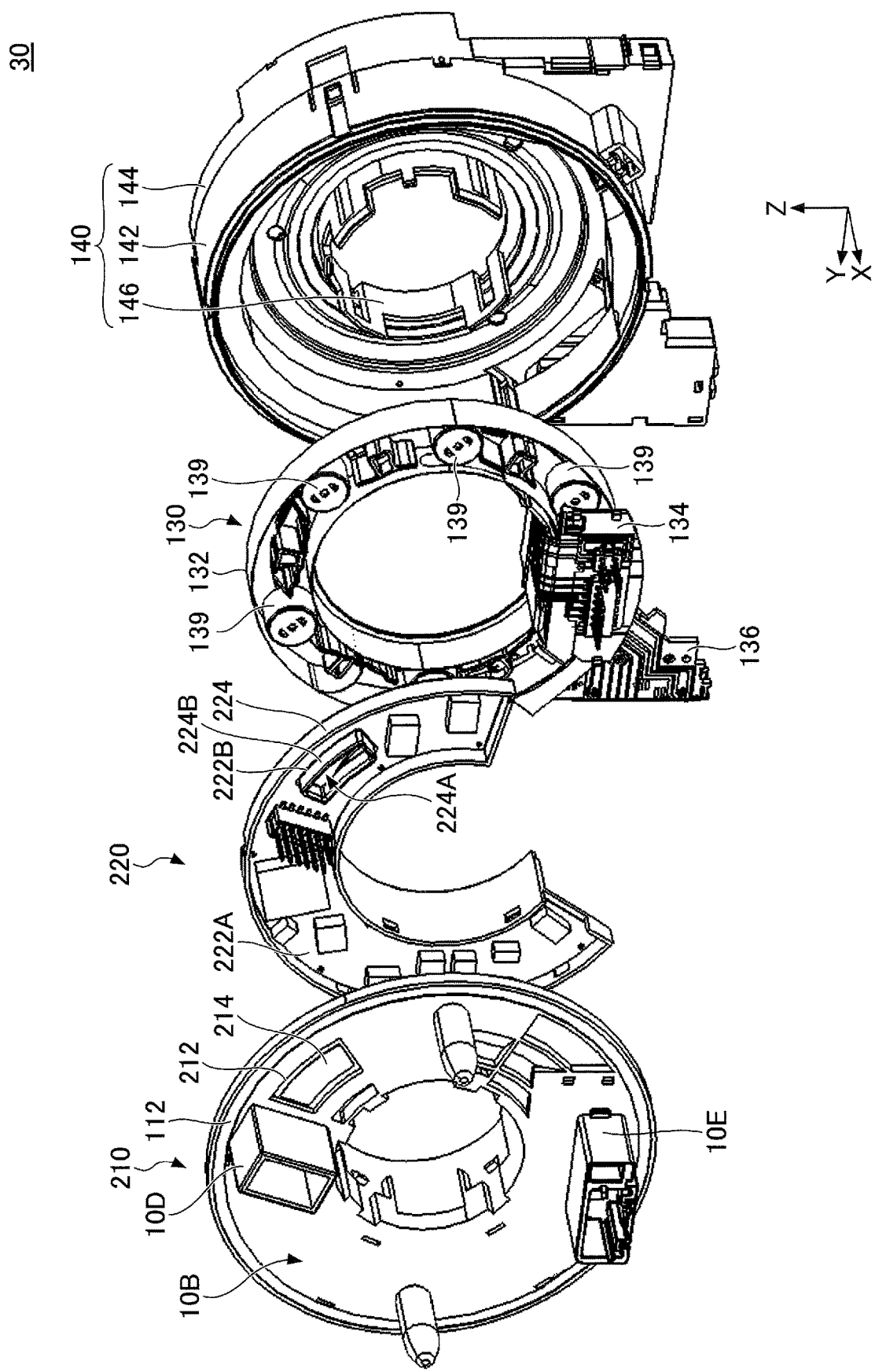
FIG. 17 is an exploded perspective view of the rotary connector according to the second embodiment.
Figure 18:
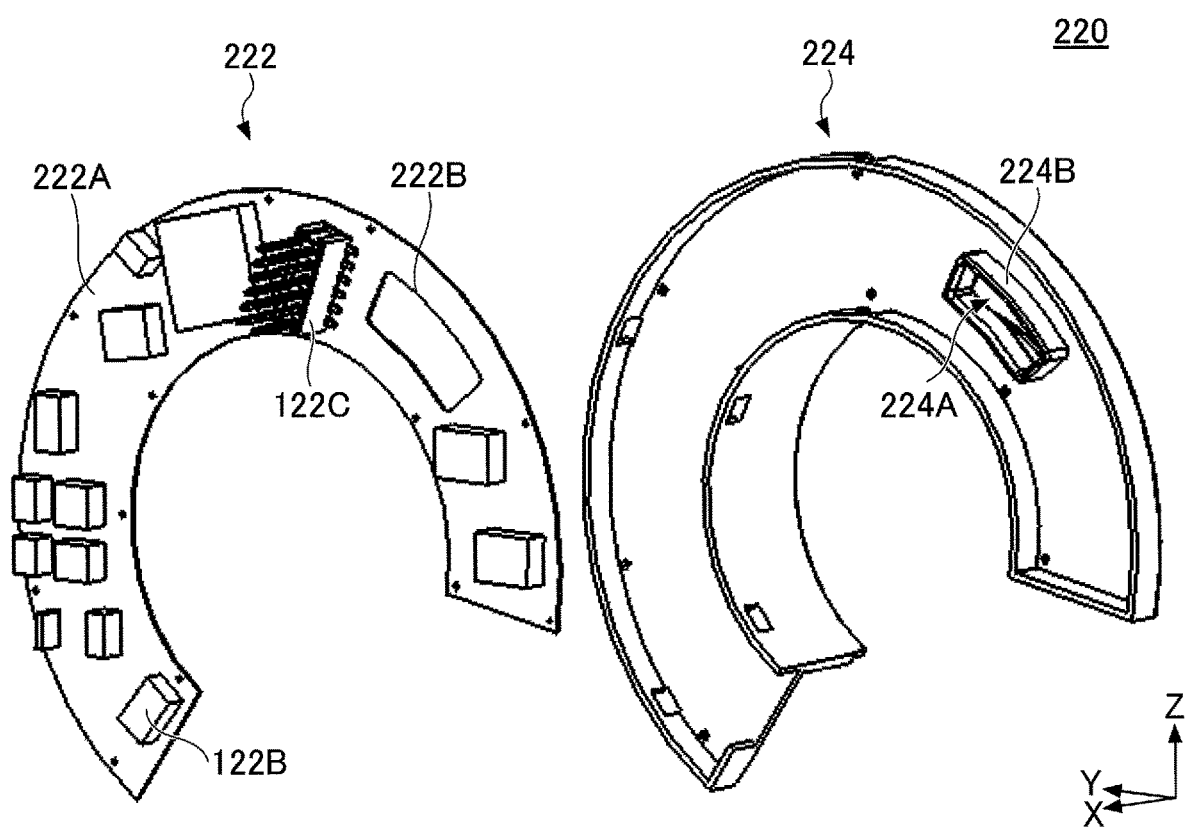
FIG. 18 is a perspective view illustrating a configuration (disassembled state) of a control unit according to the second embodiment.

FIG. 16 is a perspective view of the rotary connector 30 according to the second embodiment. FIG. 17 is an exploded perspective view of the rotary connector 30 according to the second embodiment. FIG. 18 is a perspective view illustrating a configuration (disassembled state) of a control unit 220 according to the second embodiment.

As illustrated in FIGS. 16 and 17, the rotary connector 30 is different from the rotary connector 10 of the first embodiment in that a rotor 210 is provided instead of the rotor 110, and a control unit 220 is provided instead of the control unit 120.

The rotor 210 is different from the rotor 110 of the first embodiment in that an opening 212 is provided in the flat plate part 112 that faces the housing space 142A and serves as the connection surface 10B of the rotary connector 30. The opening 212 passes through the flat plate part 112 in a direction along the rotation center axis of the rotary connector 30 (the X axis direction in the drawing).

The control unit 220 differs from the control unit 120 of the first embodiment in that a control circuit 222 including a circuit board 222A is provided instead of the control circuit 122 including the circuit board 122A, and a cover 224 is provided instead of the cover 124.

The circuit board 222A and the cover 224 facing the housing space 142A have greater sizes in the circumferential direction (a direction along the rotation direction of the rotor 210) than the circuit board 122A and the cover 124 of the first embodiment due to an increase in the number of electronic components mounted on the circuit board 222A. For this reason, an opening 222B is provided in the circuit board 222A and disposed to overlap the opening 212 of the rotor 210 in plan view seen from the steering wheel 12 (from the +X axis side in the drawing). The opening 222B passes through the circuit board 222A in a direction along the rotation center axis of the rotary connector 30 (the X-axis direction in the drawing). Similarly, an opening 224A is provided in the cover 224 and disposed to overlap the opening 212 and the opening 222B in plan view seen from the steering wheel 12 (from the +X axis side in the drawing). The opening 224A passes through the cover 224 in a direction along the rotation center axis of the rotary connector 30 (the X-axis direction in the drawing).

All of the openings 212, 222B, an 224A are disposed to overlap rollers 139 in plan view seen from the steering wheel 12 (the +X axis side in the drawing). The rollers 139 are provided in the housing space 142A of the case body 142 and guide the movement of the FPC 132.

Each of the openings 212, 222B, and 224A is an example of "a visualizing part that makes visible the predetermined visual target" and is provided to make visible the roller(s) 139 (an example of a "predetermined visual target") from the side of the rotary connector 30 facing the steering wheel 12 (the +X axis side in the drawing).

The opening 212 is covered with a transparent plate 214 from the side facing the steering wheel 12 (the +X axis side in the drawing) to prevent foreign matter from entering the housing space 142A while making visible the inside of the housing space 142A.

Also, a cylindrical peripheral wall 224B protruding toward the steering wheel 12 (in the +X axis direction in the drawing) is provided on the periphery of the opening 224A of the cover 224. The peripheral wall 224B passes through the opening 222B of the circuit board 222A so that the opening 222B can be easily positioned.

Figure 19:
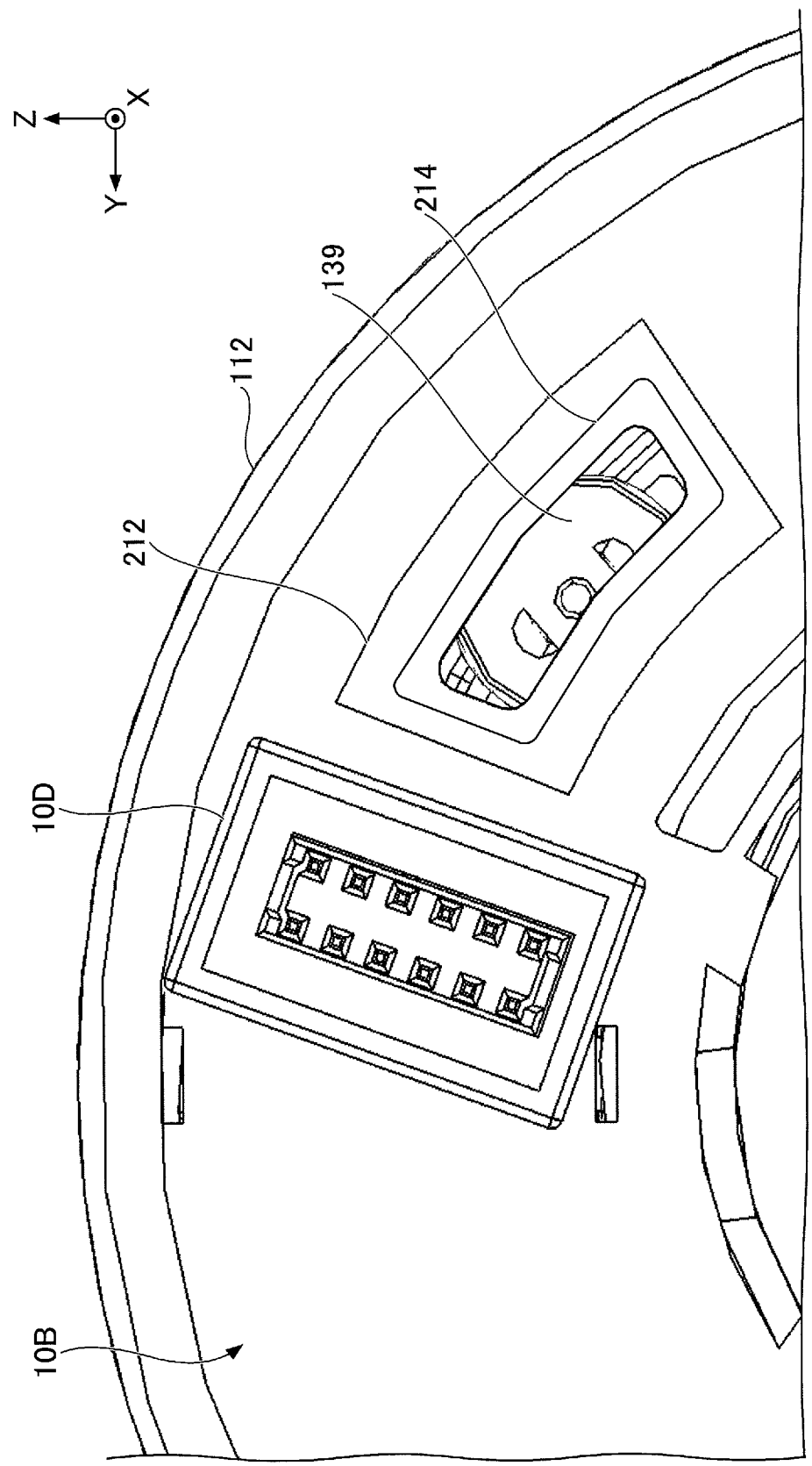
FIG. 19 is an enlarged view of a part of the rotary connector according to the second embodiment.

FIG. 19 is an enlarged view of a part of the rotary connector 30 according to the second embodiment. FIG. 19 is an enlarged plan view of a portion of the rotary connector 30 around the opening 212 seen from the steering wheel 12 (the +X axis side in the drawing).

For example, as illustrated in FIG. 19, a worker going to attach the steering wheel 12 checks the state of the roller(s) 139 provided in the housing space 142A through the openings 212, 222B, and 224A from the side of the rotary connector 30 facing the steering wheel 12 (the +X axis side in the drawing). This enables the worker to confirm the center position of the rotary connector 30 corresponding to the center position of the steering wheel 12. Then, the worker can attach the steering wheel 12 to the rotary connector 30 in a state where the center position of the steering wheel 12 matches the center position of the rotary connector 30.

Although the openings 212, 222B, and 224A have a fan shape in plan view seen from the steering wheel 12 (the +X axis side in the drawing), the openings 212, 222B, and 224A may have any other shape (for example, a square shape or a circular shape).

Also, the "predetermined visual target" is not limited to the roller 139. That is, the "predetermined visual target" may be any object that is provided in the housing space 142A and can be used to confirm the center position of the rotary connector 30. For example, the "predetermined visual target" may be the FPC 132, and the center position of the rotary connector 30 may be confirmed based on the position of a folded portion of the FPC 132.

Further, the "visualizing part configured to make visible the predetermined visual target" is not limited to the openings 212, 222B, and 224A. For example, at least a portion of any one of the rotor 210, the circuit board 222A, and the cover 224 overlapping the roller 139 may be made of a transparent material. Also, for example, an integral visualizing part may be formed in the circuit board 222A without using a separate component by implementing the circuit board 222A with an FPC formed of a transparent material and setting the wiring pattern such that no conductor is present in a portion corresponding to the visualizing part. Further, for example, a portion of any one of the rotor 210, the circuit board 222A, and the cover 224 overlapping the roller 139 may be cut out from the edge of the circuit board 222A. Further, for example, multiple dot-shaped or linear openings may be formed at least in a portion of any one of the rotor 210, the circuit board 222A, and the cover 224 overlapping the roller 139.

As described above, in the rotary connector 30 according to the second embodiment, the circuit board 222A is expanded in the circumferential direction; and the flat plate part 112 of the rotor 210, the circuit board 222A, and the cover 224, respectively, include the opening 212, the opening 222B, and the opening 224A that are disposed to overlap the roller 139 in plan view seen in the direction of the rotational axis of the rotary connector 30. This configuration of the rotary connector 30 of the second embodiment makes it possible to increase the number of electronic components that can be mounted on the circuit board 222A without increasing the size of the rotor 210, and enables the worker to check the state of the roller 139 in the housing space 142A from the side facing the steering wheel 12.

Third Embodiment

Next, a third embodiment is described with reference to FIGS. 20 through 26. In the third embodiment, a rotary connector 50 is described as a variation of the rotary connector 30 described in the second embodiment. Below, differences between the rotary connector 50 and the rotary connector 30 are mainly described. In the descriptions below, the same reference numbers as those of the rotary connectors 10 and 30 are assigned to components corresponding to the components of the rotary connectors 10 and 30, and detailed descriptions of those components are omitted.

Figure 20:
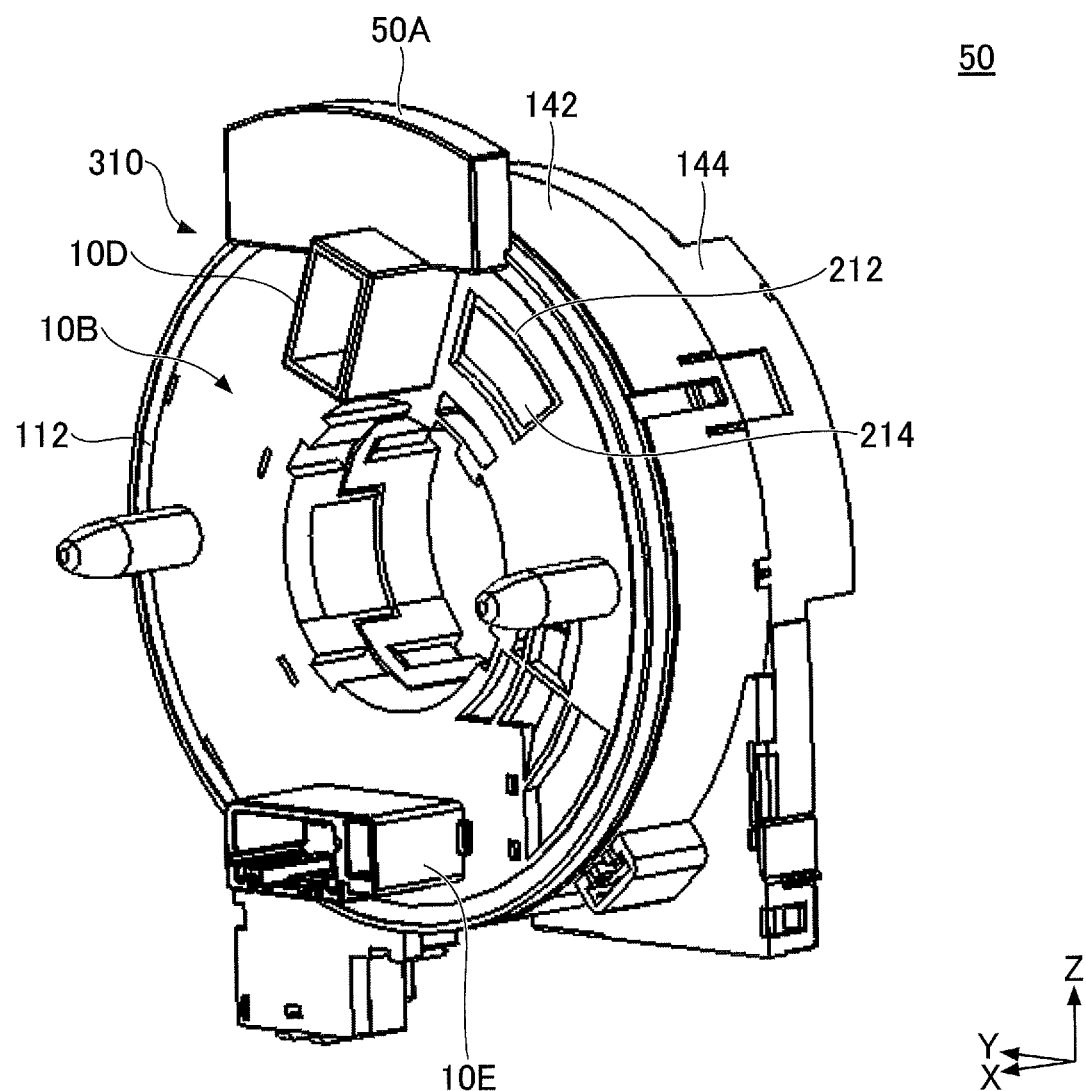
FIG. 20 is a perspective view of a rotary connector according to a third embodiment.
Figure 21:
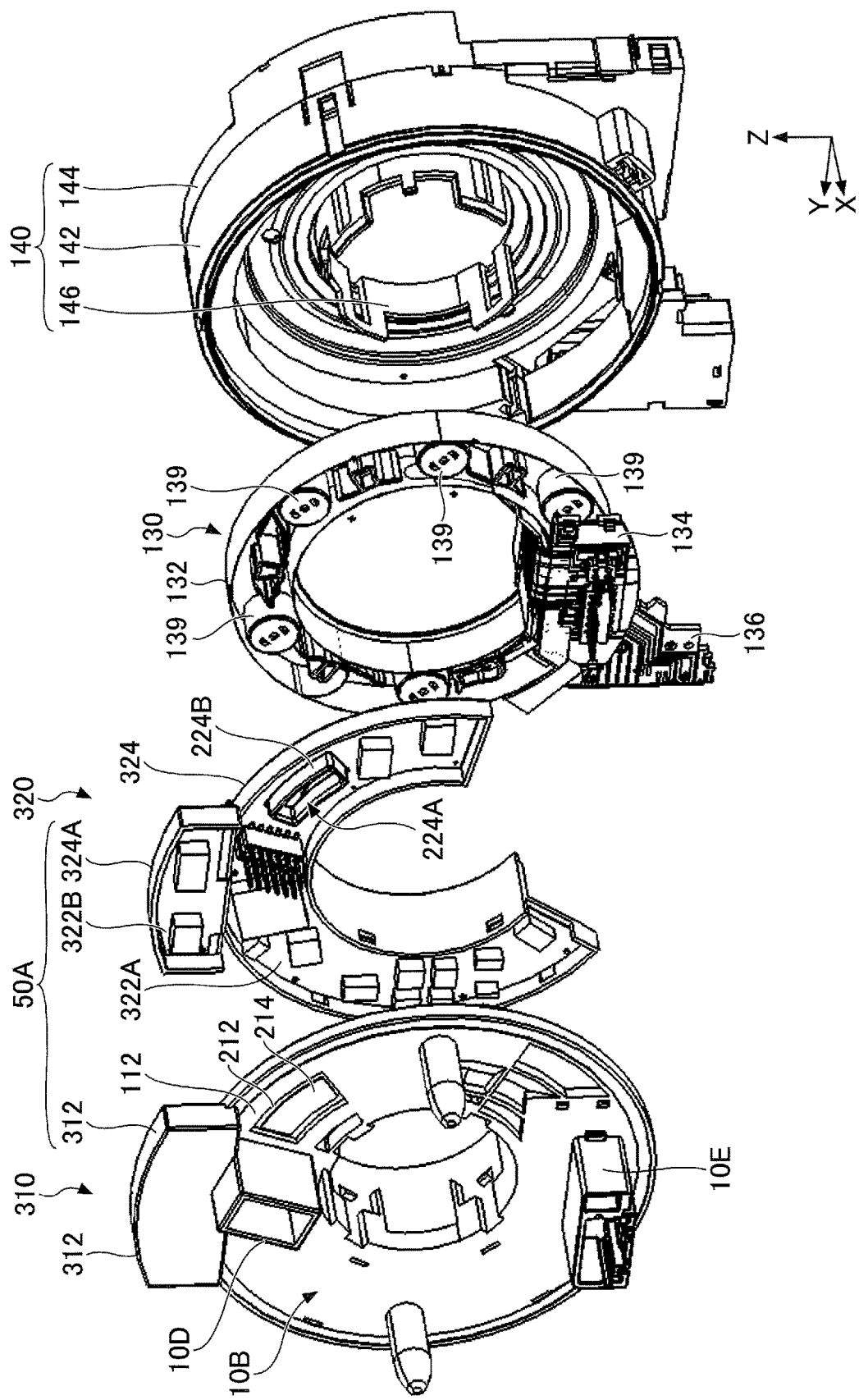
FIG. 21 is an exploded perspective view of the rotary connector according to the third embodiment.
Figure 22:
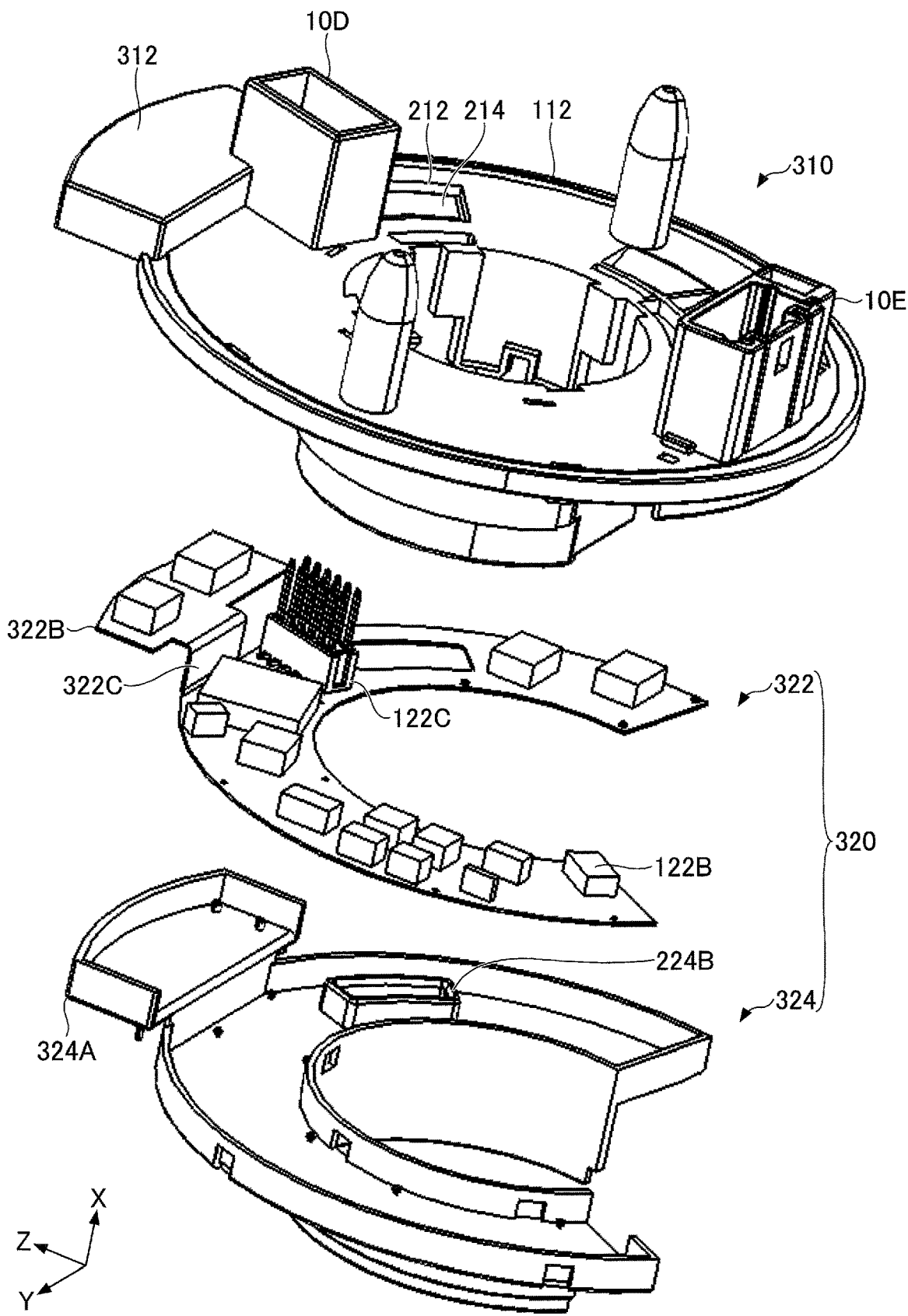
FIG. 22 is a perspective view illustrating a configuration (disassembled state) of a control unit according to the third embodiment.

FIG. 20 is a perspective view of the rotary connector 50 according to the third embodiment. FIG. 21 is an exploded perspective view of the rotary connector 50 according to the third embodiment. FIG. 22 is a perspective view illustrating a configuration (disassembled state) of a control unit 320 according to the third embodiment.

As illustrated in FIGS. 20 and 21, the rotary connector 50 is different from the rotary connector 30 of the second embodiment in that a rotor 310 is provided instead of the rotor 210 and a control unit 320 is provided instead of the control unit 220. The control unit 320 is different from the control unit 220 of the second embodiment in that a control circuit 322 including a circuit board 322A is provided instead of the control circuit 222 including the circuit board 222A, and a cover 324 is provided instead of the cover 224.

With this configuration, the rotary connector 50 includes the extension part 50A that protrudes outward in the radial direction from the outer periphery of the disc-shaped flat plate part 112 of the rotor 310 facing the housing space 142A. The extension part 50A is formed by combining a flat-plate extension part 312 provided on the rotor 310, a circuit board extension part 322B provided on the circuit board 322A, and a cover extension part 324A provided on the cover 324.

Specifically, as illustrated in FIG. 22, the circuit board 322A facing the housing space 142A includes the circuit board extension part 322B that protrudes outward in the radial direction from the outer periphery of the circuit board 322A to extend the circuit board 322A to cope with an increase in the number of electronic components mounted on the circuit board 322A.

Along with this, the cover 324 facing the housing space 142A includes the cover extension part 324A that projects outward in the radial direction from the outer periphery of the cover 324 and is disposed to overlap the circuit board extension part 322B in plan view seen from the steering wheel 12 (the +X axis side in the drawing). The cover extension part 324A extends the cover 324 and covers the surface (the −X axis side in the drawing) of the circuit board extension part 322B facing the housing space 142A.

Further, the rotor 310 includes the flat-plate extension part 312 that protrudes outward in the radial direction from the outer periphery of the disc-shaped flat plate part 112 and is disposed to overlap the circuit board extension part 322B in plan view seen from the steering wheel 12 (the +X axis side in the drawing). The flat-plate extension part 312 extends the flat plate part 112 and covers the surface (the +X axis side in the drawing) of the circuit board extension part 322B facing the steering wheel 12.

As illustrated in FIG. 22, the circuit board 322A includes an offset part 322C between the outer periphery of the circuit board 322A and the circuit board extension part 322B. The offset part 322C is perpendicular to the surface of the circuit board 322A and offsets the circuit board extension part 322B toward the steering wheel 12 (in the +X axis direction in the drawing). To match this configuration, the cover extension part 324A of the cover 324 is offset toward the steering wheel 12 (in the +X axis direction in the drawing). Similarly, the flat-plate extension part 312 of the rotor 310 is offset toward the steering wheel 12 (in the +X axis direction in the drawing).

Figure 23:
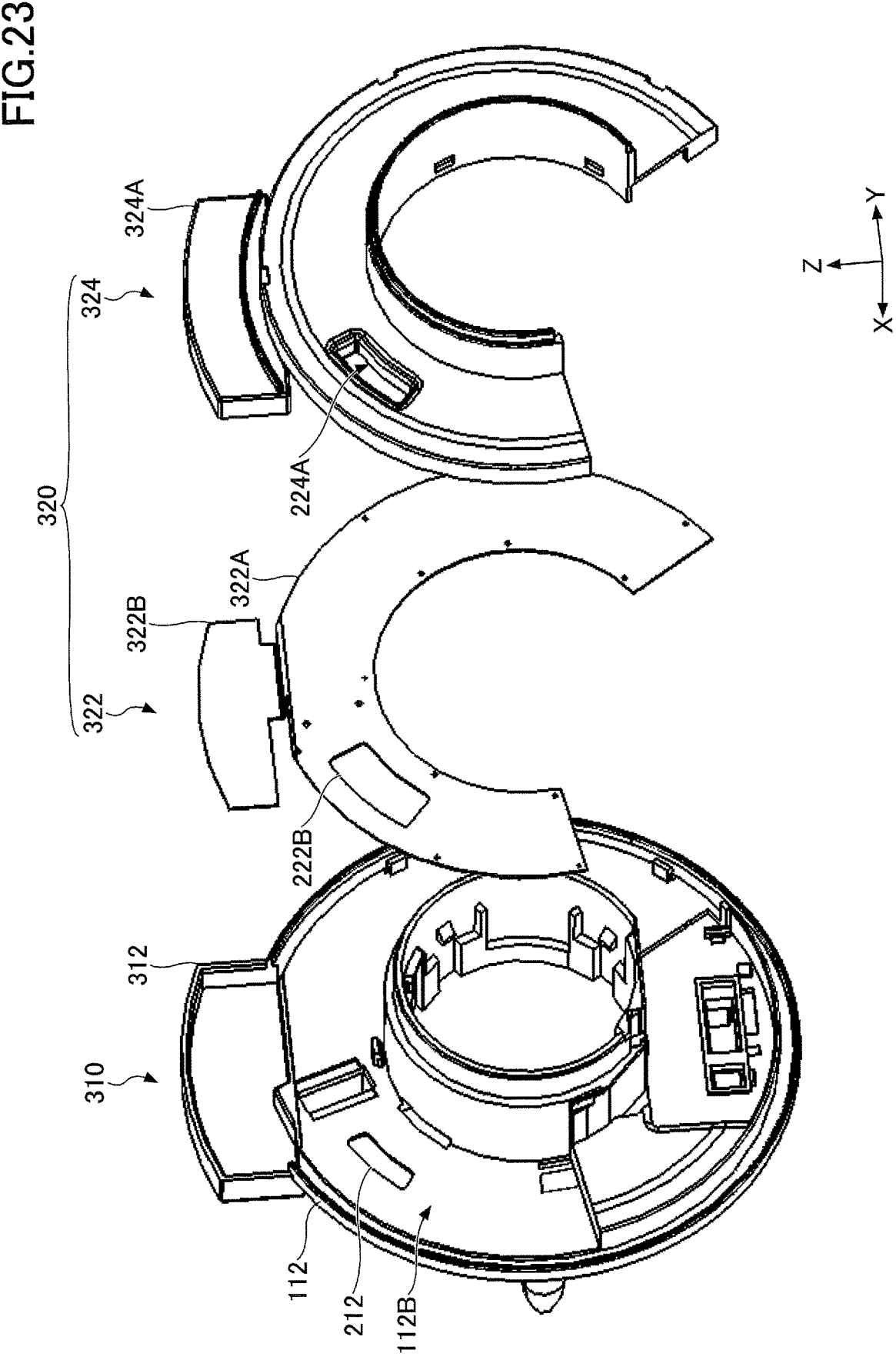
FIG. 23 is a drawing illustrating a rotor and the control unit (disassembled state) of the third embodiment seen from a housing space.
Figure 24:
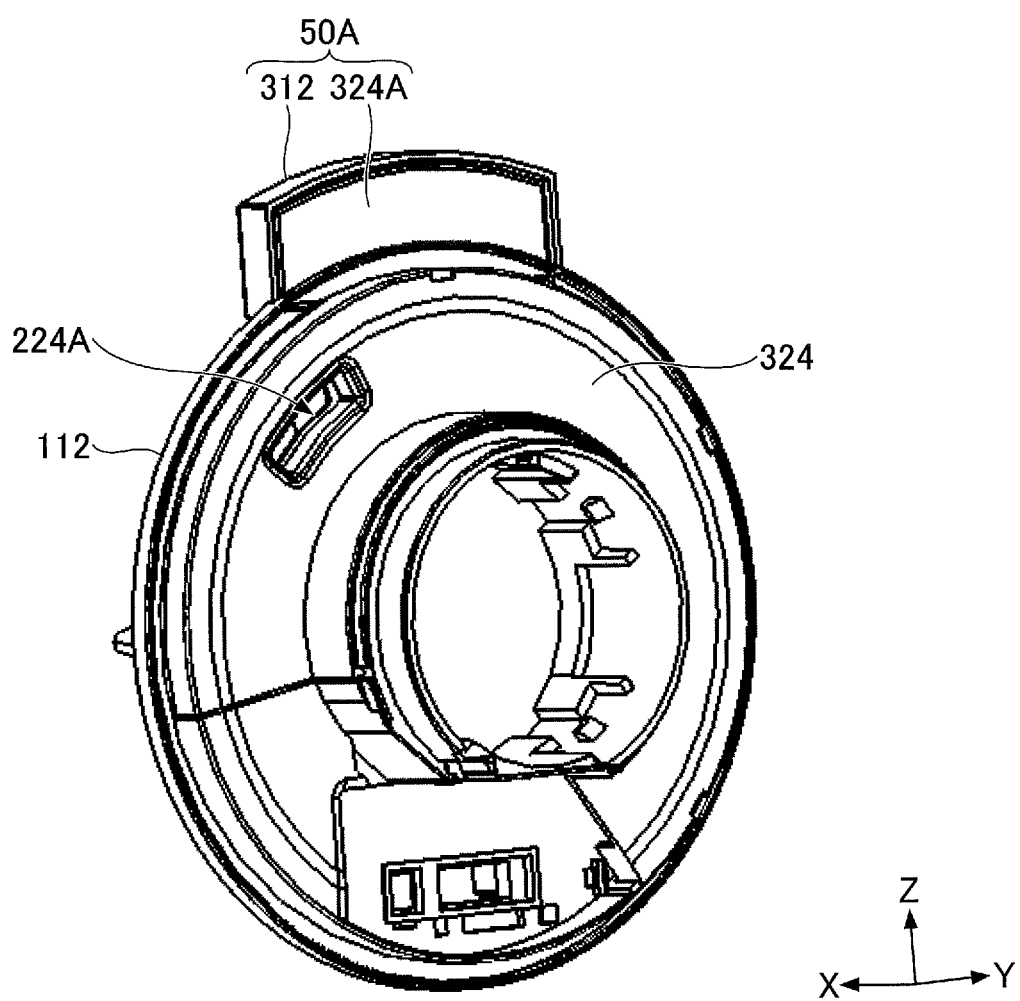
FIG. 24 is a drawing illustrating the rotor and the control unit (assembled state) of the third embodiment seen from the housing space.

FIG. 23 is a drawing illustrating the rotor 310 and the control unit 320 (in the disassembled state) of the third embodiment seen from the side facing the housing space 142A. FIG. 24 is a drawing illustrating the rotor 310 and the control unit 320 (in the assembled state) of the third embodiment seen from the side facing the housing space 142A.

The control unit 320 is formed by attaching the circuit board 322A to the surface of the cover 324 facing the steering wheel 12 (the +X axis side in the drawing) and thereby combining the cover 324 and the circuit board 322A. In this state, the circuit board extension part 322B of the circuit board 322A is placed in the cover extension part 324A of the cover 324. The cover extension part 324A has substantially the same shape as the circuit board extension part 322B, and includes a peripheral wall that is perpendicular to its outer periphery. This configuration of the cover extension part 324A makes it possible to easily and reliably position and place the circuit board extension part 322B with respect to the cover extension part 324A.

As illustrated in FIG. 24, the control unit 320 is attached to the surface of the rotor 310 facing the housing space 142A (the −X axis side in the drawing). Specifically, the cover 324, to which the circuit board 322A is attached, is fit into a cutout space 112B that is formed on the surface of the rotor 310 facing the housing space 142A (the −X axis side in the drawing) and has substantially the same shape as the cover 324 (i.e., a fan shape in plan view). In this state, the cover extension part 324A of the cover 324 holding the circuit board extension part 322B of the circuit board 322A is fit into the flat-plate extension part 312 of the rotor 310 and as a result, the container-shaped extension part 50A housing the circuit board extension part 322B is formed. The flat-plate extension part 312 has substantially the same shape as the cover extension part 324A, and includes a peripheral wall that is perpendicular to its outer periphery. This configuration of the flat-plate extension part 312 makes it possible to easily and reliably position and attach the cover extension part 324A with respect to the flat-plate extension part 312.

As a result of attaching the control unit 320 to the rotor 310, the opening 212 of the rotor 310, the opening 222B of the circuit board 322A, and the opening 224A of the cover 324 overlap each other. Accordingly, as described in the second embodiment, the state of the roller 139 in the housing space 142A becomes visible from the side facing the steering wheel 12 (the +X axis side in the drawing).

Figure 25:
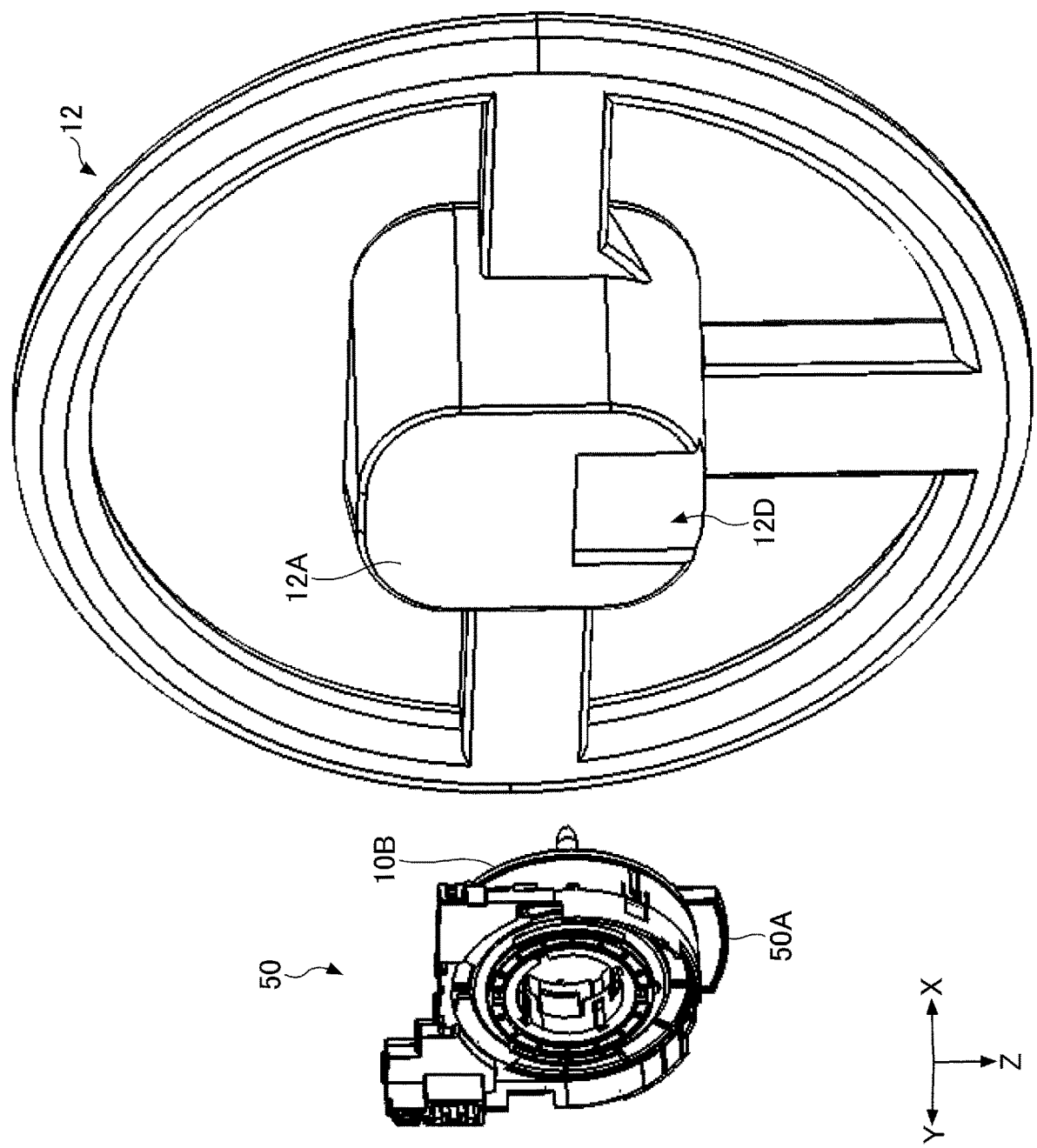
FIG. 25 is a drawing illustrating the rotary connector and a steering wheel (disassembled state) of the third embodiment seen from a vehicle body side.
Figure 26:
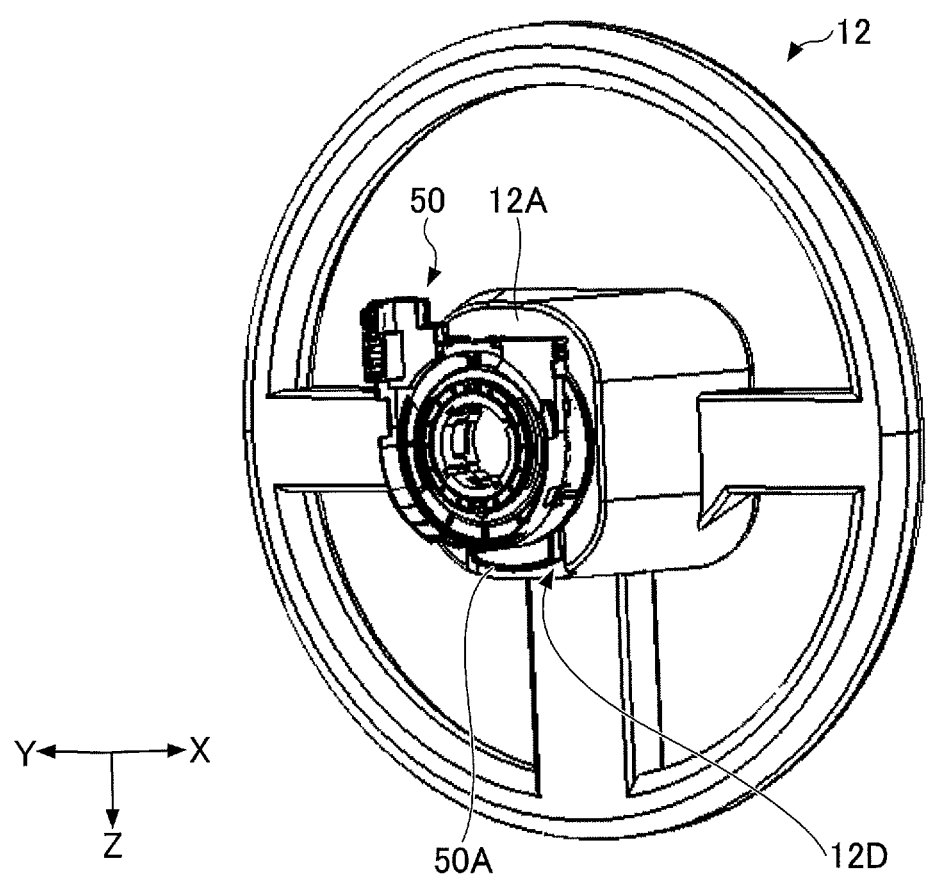
FIG. 26 is a drawing illustrating the rotary connector and the steering wheel (assembled state) of the third embodiment seen from the vehicle body side.
Figure 27:
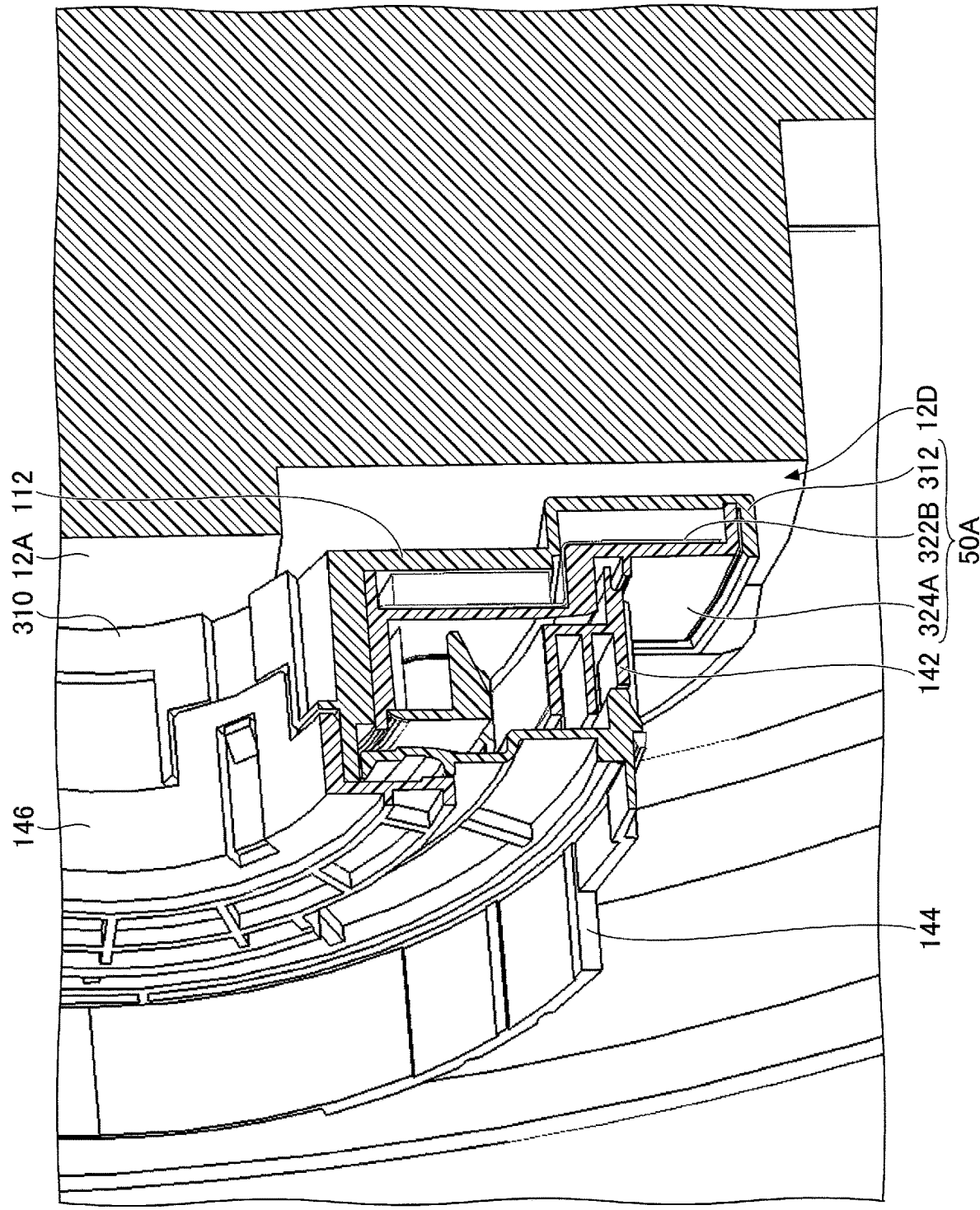
FIG. 27 is an enlarged view of parts of the rotary connector and the steering wheel illustrated in FIG. 26.

FIG. 25 is a drawing illustrating the rotary connector 50 and the steering wheel 12 (in the disassembled state) of the third embodiment seen from the vehicle body 14. FIG. 26 is a drawing illustrating the rotary connector 50 and the steering wheel 12 (in the assembled state) of the third embodiment seen from the vehicle body 14. FIG. 27 is an enlarged cross-sectional view of parts of the rotary connector 50 and the steering wheel 12 illustrated in FIG. 26.

As illustrated in FIGS. 25 and 26, the steering wheel 12 is statically attached to the rotary connector 50 such that the connection surface 12A, which is the back surface of a hub in the center of the steering wheel 12, is in close contact with the connection surface 10B of the rotary connector 50.

A recess 12D is formed in the connection surface 12A such that a portion of the connection surface 12A is dented. In plan view seen from the vehicle body 14 (from the −X axis side in the drawing), the recess 12D is disposed to overlap the extension part 50A of the rotary connector 50 and has a shape that can accommodate the extension part 50A.

As illustrated in FIGS. 26 and 27, when the steering wheel 12 is attached to the rotary connector 50, the extension part 50A fits in the recess 12D without interfering with the connection surface 12A. With this configuration, the amount of the extension part 50A protruding from the connection surface 12A of the steering wheel 12 toward the vehicle body 14 (the −X axis side in the drawing) is reduced. This makes it possible to effectively use the space around the rotary connector 50 on the back side of the steering wheel 12.

Also, the extension part 50A fits in and does not protrude from the projected area of the hub provided in the center of the steering wheel 12 when viewed from the driver's seat (the +X axis side in the drawing). Thus, the extension part 50A does not affect the design and the visibility of instruments around the steering wheel 12 seen from the driver's seat.

As described above, in the rotary connector 50 according to the third embodiment, the flat plate part 112 of the rotor 310, the circuit board 322A, and the cover 324 include, respectively, the flat-plate extension part 312, the circuit board extension part 322B, and the cover extension part 324A that protrude outward in the radial direction from the outer periphery of the flat plate part 112 in plan view seen in the direction of the rotational axis of the rotary connector 50. In particular, in the rotary connector 50 according to the third embodiment, each of the flat-plate extension part 312, the circuit board extension part 322B, and the cover extension part 324A fits in the projected area of the hub, which is a component of the steering wheel 12, in plan view seen in the direction of the rotary axis of the rotary connector 50. This configuration of the rotary connector 50 of the third embodiment makes it possible to increase the number of electronic components that can be mounted on the circuit board 322A without increasing the size of the rotor 210 and without affecting the design and the visibility of instruments around the steering wheel 12 seen from the driver's seat.

The rotary connector 50 of the third embodiment may also be configured such that the extension part 50A is not offset toward the steering wheel 12. In this case, the recess 12D in the steering wheel 12 may be omitted. Also, instead of one extension part 50A, the rotary connector 50 may include multiple extension parts 50A protruding from its outer periphery.

Further, the extension part 50A may not necessarily fit in the projected area of the hub of the steering wheel 12. For example, the extension part 50A may be configured to fit in the projected area of a spoke of the steering wheel 12. Particularly, the extension part 50A may be provided to overlap and extend along a spoke that extends in the radial direction of the steering wheel 12 from the hub provided in the center of the steering wheel 12. In this case, even if the protruding amount of the extension part 50A is increased further, the extension part 50A is not visible from the driver's seat side and does not affect the design and the visibility of instruments.

Further, the extension part 50A may be used not only to simply increase the available area and increase the number of electronic components mountable on the circuit board 322A, but also to mount a large electronic component on the circuit board 322A. That is, because the circuit board extension part 322B protrudes outward in the radial direction from the outer periphery of the circuit board 322A, the circuit board extension part 322B makes it possible to mount an electric component such as a large-size IC that could not be mounted due to the limit of the size of the circuit board 322A in the radial direction.

Embodiments of the present invention are described above. However, the present invention is not limited to the specifically disclosed embodiments, and variations and modifications may be made without departing from the scope of the present invention.

For example, although the "extension part" of the present invention is preferably provided on each of the "flat plate part", the "circuit board", and the "cover", this is not essential. The "extension part" may be provided at least on the "circuit board". Accordingly, the "extension part" of the present invention may be used for a rotary connector that does not include the "cover".

Also, for example, the "visualizing part" of the present invention is preferably provided in each of the "flat plate part", the "circuit board", and the "cover". However, the "visualizing part" may be provided at least in each of the "flat plate part" and the "circuit board". Therefore, the "visualizing part" of the present invention may be applied to a rotary connector that does not include the "cover".

Further, an FPC is used as an example of the "flexible cable" in the above embodiments. However, the present invention is not limited to this example, and a flat cable may be used as the "flexible cable".

In the above embodiments, an FPC is used as an example of the "relay board". However, the present invention is not limited to this example, and a rigid board such as a printed wiring board (PWB) may be used as the "relay board".

Further, in the above embodiments, an FPC is used for each of the circuit boards 122A, 222A, and 322A. However, the present invention is not limited to this example, and a rigid board such as a PWB may be used for each of the circuit boards 122A, 222A, and 322A.

In the above embodiments, the control circuits 122, 222, and 322 have a fan shape in plan view. However, the present invention is not limited to this example, and the control circuit 122 may have any shape as long as it can be installed in the rotor 110.

In the above embodiments, the control unit 120/220/320 is provided on the back surface of the rotor 110/210/310 that slides over the FPC 132 in the housing space 142A, and the FPC 132 slides over both of the flat plate part 112 and the cover 124/224/324. However, the present invention is not limited to this example, and the control unit 120/220/320 may be provided on the front surface of the rotor 110/210/310 facing the steering wheel 12. In this case, the FPC 132 slides only over the back surface of the flat plate part 112, and the cover 124/224/324 does not need to have a flat surface.

Further, in the above embodiments, the relay FPC 138 and the circuit board 122A/222A/322A are provided separately. However, the present invention is not limited to this example, and the relay FPC 138 and the circuit board 122A/222A/322A may be combined into a single FPC as in the variations described below. That is, the control circuit 122/222/322 may be provided on the relay FPC 138.

(Variations of Relay FPC 138 and Control Circuit 122)

Figure 15:
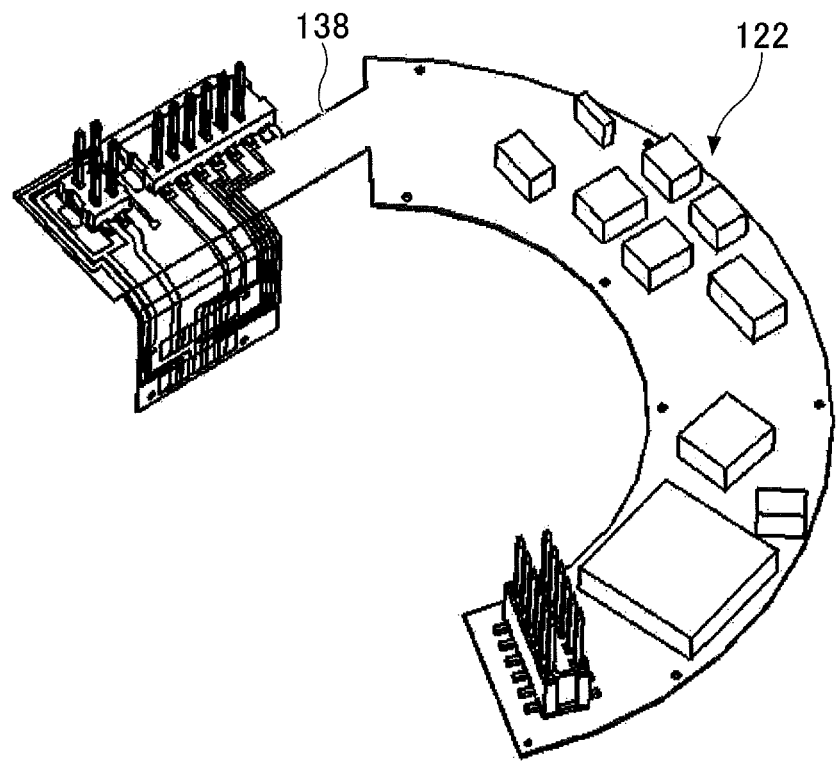
FIG. 15 is a drawing illustrating variations of a relay FPC and a control circuit according to the first embodiment.

FIG. 15 is a drawing illustrating variations of the relay FPC 138 and the control circuit 122 of the first embodiment. In the example illustrated in FIG. 15, the control circuit 122 and the relay FPC 138 are integrated on the same board. For example, this configuration makes it possible to reduce the number of components. Providing the relay FPC 138 separately from the FPC 132 makes it possible to form only the component for connecting the control circuit 122 in a shape different from the FPC 132. This makes it possible to form the entire FPC 132 in a constant strip shape and makes it easier to produce the FPC 132.

What is claimed is:

1. A rotary connector, comprising:
a case including a housing space and fixed to a vehicle body that includes a steering wheel including a steering-side electric component;
a rotor that is rotatable around a rotational axis relative to the case;
a first connector provided on the rotor and electrically connected to the steering-side electric component;
a second connector provided on the case and electrically connected to a vehicle-side electric component in the vehicle body;
a flexible cable that is provided in a wound state in the housing space of the case and electrically connects the first connector to the second connector; and
a controller that is disposed between the first connector and the flexible cable and performs a predetermined process on an electric signal transmitted between the first connector and the flexible cable,
wherein the controller is configured to rotate together with the rotor,
the rotor includes a disc-shaped flat plate part that constitutes the rotor and faces the housing space;
the controller includes a circuit board that faces the housing space; and
each of the flat plate part and the circuit board includes a visualizing part that is disposed to overlap a predetermined visual target provided in the housing space in plan view seen in a direction of the rotational axis and makes visible the predetermined visual target.

2. The rotary connector as claimed in claim 1, wherein the visualizing part of the circuit board is an opening formed in the circuit board.

3. The rotary connector as claimed in claim 1, further comprising:
a cover that faces the housing space and holds the circuit board,
wherein the cover includes a visualizing part that makes visible the predetermined visual target and is disposed to overlap the predetermined visual target provided in the housing space in plan view seen in the direction of the rotational axis.

4. The rotary connector as claimed in claim 1, wherein the circuit board is a flexible printed circuit (FPC).

5. A rotary connector, comprising:
a case including a housing space and fixed to a vehicle body that includes a steering wheel including a steering-side electric component;
a rotor that is rotatable around a rotational axis relative to the case;
a first connector provided on the rotor and electrically connected to the steering-side electric component;
a second connector provided on the case and electrically connected to a vehicle-side electric component in the vehicle body;
a flexible cable that is provided in a wound state in the housing space of the case and electrically connects the first connector to the second connector; and
a controller that is disposed between the first connector and the flexible cable and performs a predetermined process on an electric signal transmitted between the first connector and the flexible cable,
wherein the controller is configured to rotate together with the rotor,
the rotor includes a disc-shaped flat plate part that constitutes the rotor and faces the housing space;
the controller includes a circuit board facing the housing space; and
the circuit board includes a circuit board extension part that protrudes outward in a radial direction from an outer periphery of the flat plate part in plan view seen in the direction of the rotational axis.

6. The rotary connector as claimed in claim 5, further comprising:
a cover that faces the housing space and holds the circuit board,
wherein the flat plate part and the cover include, respectively, a flat-plate extension part and a cover extension part that protrude outward in the radial direction from the outer periphery of the flat plate part in plan view seen in the direction of the rotational axis.

7. The rotary connector as claimed in claim 6, wherein the flat-plate extension part, the circuit board extension part, and the cover extension part fit in a projected area of a component of the steering wheel in plan view seen in the direction of the rotational axis.

8. The rotary connector as claimed in claim 6, wherein the flat-plate extension part, the circuit board extension part, and the cover extension part are offset from the flat plate part toward the steering wheel.

9. The rotary connector as claimed in claim 5, wherein the circuit board is a flexible printed circuit (FPC).

10. A rotary connector, comprising:
a case including a housing space and fixed to a vehicle body that includes a steering wheel including a steering-side electric component;
a rotor that is rotatable around a rotational axis relative to the case;
a first connector provided on the rotor and electrically connected to the steering-side electric component;
a second connector provided on the case and electrically connected to a vehicle-side electric component in the vehicle body;
a flexible cable that is provided in a wound state in the housing space of the case and electrically connects the first connector to the second connector; and
a controller that is disposed between the first connector and the flexible cable and performs a predetermined process on an electric signal transmitted between the first connector and the flexible cable,
wherein the controller is configured to rotate together with the rotor, and
wherein the controller is held by a flat plate part of the rotor, the flat plate part facing the housing space and extending in a direction orthogonal to the rotational axis.

11. The rotary connector as claimed in claim 10, wherein
the rotor includes an opening that is disposed in a center of the rotor in plan view seen in the direction of the rotational axis; and
the controller is held in an area between an inner periphery along the opening and an outer periphery of the flat plate part.

12. The rotary connector as claimed in claim 11, wherein the controller has a fan shape extending along the inner periphery and the outer periphery in plan view seen in the direction of the rotational axis.

13. The rotary connector as claimed in claim 11, further comprising:
a cover that holds the controller on the flat plate part of the rotor.

14. The rotary connector as claimed in claim 13, wherein a surface of the cover facing the flexible cable is configured such that the flexible cable is slidable over the surface.

15. The rotary connector as claimed in claim 14, wherein
the cover is disposed in a recess that is formed in the surface of the flat plate part facing the flexible cable and has substantially a same shape as the cover; and
both of the surface of the flat plate part facing the flexible cable and the surface of the cover facing the flexible cable are configured such that the flexible cable is slidable over the surfaces.

16. The rotary connector as claimed in claim 10, wherein the controller includes a circuit board formed of a flexible printed circuit (FPC) and a control circuit provided on the circuit board.

17. The rotary connector as claimed in claim 16, further comprising:
a relay board that connects the flexible cable to the controller.

18. The rotary connector as claimed in claim 17, wherein
the relay board is formed of a flexible printed circuit (FPC); and
the circuit board and the relay board are combined into a single component.

19. The rotary connector as claimed in claim 10, wherein the controller includes an electric circuit that is configured to convert an analog signal that is input from the first connector to a digital signal and output the digital signal to the flexible cable.

* * * * *